(12) United States Patent
Furuichi et al.

(10) Patent No.: US 10,845,740 B2
(45) Date of Patent: Nov. 24, 2020

(54) TEMPERATURE DETECTOR, HEATING DEVICE, FIXING DEVICE, AND IMAGE FORMING APPARATUS

(71) Applicants: Yuusuke Furuichi, Kanagawa (JP); Hiroshi Seo, Kanagawa (JP); Yoshiki Yamaguchi, Kanagawa (JP)

(72) Inventors: Yuusuke Furuichi, Kanagawa (JP); Hiroshi Seo, Kanagawa (JP); Yoshiki Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/656,724

(22) Filed: Oct. 18, 2019

(65) Prior Publication Data
US 2020/0183307 A1  Jun. 11, 2020

(30) Foreign Application Priority Data

Dec. 7, 2018 (JP) .................................. 2018-243688

(51) Int. Cl.
| | |
|---|---|
| *G03G 15/20* | (2006.01) |
| *G05D 23/24* | (2006.01) |
| *G03G 15/00* | (2006.01) |
| *G03G 21/16* | (2006.01) |
| *G03G 21/20* | (2006.01) |

(52) U.S. Cl.
CPC ..... *G03G 15/2039* (2013.01); *G03G 15/2053* (2013.01); *G03G 15/2064* (2013.01); *G03G 15/5004* (2013.01); *G03G 21/1647* (2013.01); *G03G 21/20* (2013.01); *G05D 23/24* (2013.01); *G03G 2215/2035* (2013.01)

(58) Field of Classification Search
CPC .......... G03G 15/2039; G03G 15/2053; G03G 15/2064; G03G 15/5004; G03G 21/1647; G03G 2215/2035; G05D 23/24
See application file for complete search history.

(56) References Cited

U.S. PATENT DOCUMENTS

| | | | |
|---|---|---|---|
| 9,927,745 B2* | 3/2018 | Yoshimura | ......... G03G 15/2039 |
| 2002/0118978 A1* | 8/2002 | Nakamura | ......... G03G 15/2042 |
| | | | 399/69 |
| 2016/0170338 A1* | 6/2016 | Tateishi | ............. G03G 15/2053 |
| | | | 399/329 |
| 2017/0075268 A1* | 3/2017 | Ogura | ................. G03G 15/2053 |
| 2017/0371283 A1* | 12/2017 | Fujita | ................. G03G 15/2053 |

(Continued)

FOREIGN PATENT DOCUMENTS

| | | |
|---|---|---|
| JP | 2016-045130 | 4/2016 |
| WO | WO2015/012306 A1 | 1/2015 |

OTHER PUBLICATIONS

U.S. Appl. No. 16/519,254, filed Jul. 23, 2019 Daisuke Inoue, et al.
(Continued)

*Primary Examiner* — Sophia S Chen
(74) *Attorney, Agent, or Firm* — Oblon, McClelland, Maier & Neustadt, L.L.P.

(57) ABSTRACT

A temperature detector for being positioned with respect to a counterpart includes a temperature detecting element that detects a temperature of a detecting target and a holding body that holds the temperature detecting element. A projecting engagement engages the counterpart and is mounted on the holding body.

20 Claims, 17 Drawing Sheets

(56) References Cited

U.S. PATENT DOCUMENTS

| | | |
|---|---|---|
| 2019/0278206 A1 | 9/2019 | Adachi et al. |
| 2019/0286026 A1 | 9/2019 | Furuichi et al. |
| 2019/0286028 A1 | 9/2019 | Furuichi et al. |
| 2019/0286029 A1 | 9/2019 | Adachi et al. |

OTHER PUBLICATIONS

U.S. Appl. No. 16/520,409, filed Jul. 24, 2019 Hiroshi Yoshinaga, et al.
U.S. Appl. No. 16/502,473, filed Jul. 3, 2019 Yuusuke Furuichi, et al.
U.S. Appl. No. 16/502,348, filed Jul. 3, 2019 Yuusuke Furuichi, et al.
U.S. Appl. No. 16/391,959, filed Apr. 23, 2019, Takamasa Hase, et al.
U.S. Appl. No. 16/451,512, filed Jun. 25, 2019 Tomoya Adachi, et al.

\* cited by examiner

TEMPERATURE DETECTOR, HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-243688, filed on Dec. 7, 2018, in the Japan Patent Office, the entire disclosure of which is hereby incorporated by reference herein.

BACKGROUND

Technical Field

Exemplary aspects of the present disclosure relate to a temperature detector, a heating device, a fixing device, and an image forming apparatus, and more specifically, to a temperature detector, a heating device incorporating the temperature detector, a fixing device incorporating the heating device, and an image forming apparatus incorporating the heating device.

Discussion of the Background Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses include a fixing device that fixes a toner image on a sheet serving as a recording medium under heat and a dryer that dries ink on a sheet. The fixing device and the dryer are installed with a heater including a heat generator. Generally, the fixing device and the dryer that incorporate the heater include a temperature detector, such as a thermistor, which detects the temperature of the heater or a heated member heated by the heater.

For example, a holding body that holds a heat sensitive element and the like includes a through hole that engages an engaging projection used to attach a temperature sensor.

If the holding body that holds the temperature sensor includes a hole for positioning, for example, wires and the like disposed inside the holding body are requested to stay clear of the hole. Thus, the hole disposed in the holding body may restrict routing and wiring of parts such as the wires disposed inside the holding body, decreasing flexibility in a layout of parts.

SUMMARY

This specification describes below an improved temperature detector for being positioned with respect to a counterpart. In one embodiment, the temperature detector includes a temperature detecting element that detects a temperature of a detecting target and a holding body that holds the temperature detecting element. A projecting engagement engages the counterpart and is mounted on the holding body.

This specification further describes an improved heating device. In one embodiment, the heating device includes a heater including a heat generator. A temperature detector detects a temperature of one of the heater and a heated member heated by the heater. A biasing member biases the temperature detector against the one of the heater and the heated member. The temperature detector is positioned with respect to a counterpart. The temperature detector includes a temperature detecting element that detects the temperature of the one of the heater and the heated member and a holding body that holds the temperature detecting element. The holding body is biased by the biasing member. A projecting engagement engages the counterpart and is mounted on the holding body.

This specification further describes an improved fixing device. In one embodiment, the fixing device includes the heating device described above.

This specification further describes an improved image forming apparatus. In one embodiment, the image forming apparatus includes an image forming device that forms an image, a heated member that fixes the image on a recording medium, and a heating device that heats the heated member. The heating device includes a heater including a heat generator. A temperature detector detects a temperature of one of the heater and the heated member. A biasing member biases the temperature detector against the one of the heater and the heated member. The temperature detector is positioned with respect to a counterpart. The temperature detector includes a temperature detecting element that detects the temperature of the one of the heater and the heated member. A holding body holds the temperature detecting element and is biased by the biasing member. A projecting engagement engages the counterpart and is mounted on the holding body.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
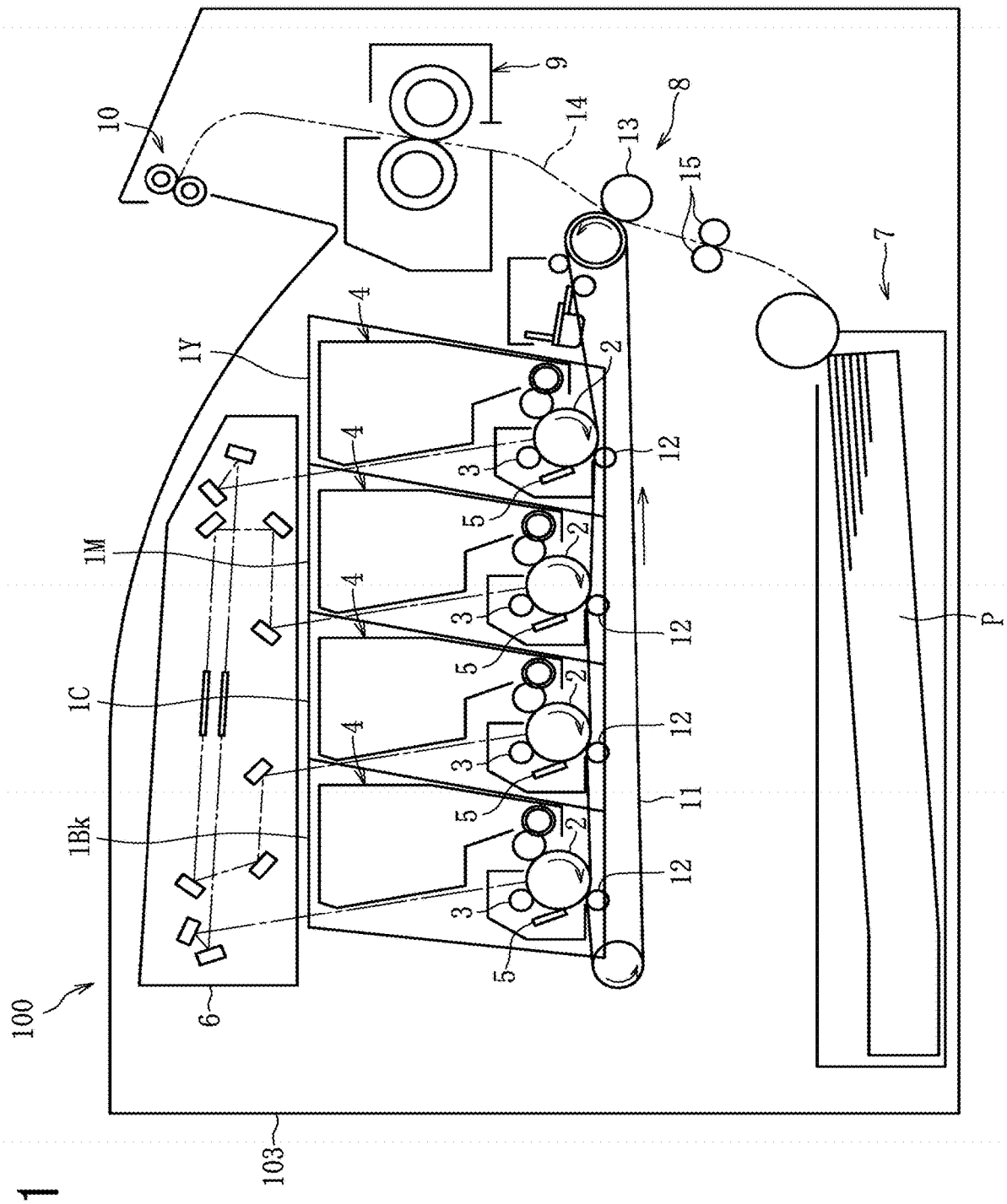
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring to the attached drawings, the following describes a construction of an image forming apparatus 100 according to embodiments of the present disclosure.

In the drawings for explaining the embodiments of the present disclosure, identical reference numerals are assigned to elements such as members and parts that have an identical function or an identical shape as long as differentiation is possible and a description of those elements is omitted once the description is provided.

FIG. 1 is a schematic cross-sectional view of the image forming apparatus 100 according to an embodiment of the present disclosure. The image forming apparatus 100 is a printer. Alternatively, the image forming apparatus 100 may be a copier, a facsimile machine, a multifunction peripheral (MFP) having at least two of printing, copying, facsimile, scanning, and plotter functions, or the like.

As illustrated in FIG. 1, the image forming apparatus 100 includes four image forming units 1Y, 1M, 1C, and 1Bk serving as image forming devices, respectively. The image forming units 1Y, 1M, 1C, and 1Bk are removably installed in a body 103 of the image forming apparatus 100. The image forming units 1Y, 1M, 1C, and 1Bk have a similar construction except that the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as a developer to the surface of the photoconductor 2 to form a toner image. The cleaner 5 cleans the surface of the photoconductor 2.

The image forming apparatus 100 further includes an exposure device 6, a sheet feeding device 7, a transfer device 8, a fixing device 9, and a sheet ejection device 10. The exposure device 6 exposes the surface of each of the photoconductors 2 and forms an electrostatic latent image thereon. The sheet feeding device 7 supplies a sheet P serving as a recording medium or a heating target to the transfer device 8. The transfer device 8 transfers the toner image formed on each of the photoconductors 2 onto the sheet P. The fixing device 9 fixes the toner image transferred onto the sheet P thereon. The sheet ejection device 10 ejects the sheet P onto an outside of the image forming apparatus 100.

The transfer device 8 includes an intermediate transfer belt 11, four primary transfer rollers 12, and a secondary transfer roller 13. The intermediate transfer belt 11 is an endless belt serving as an intermediate transferor stretched taut across a plurality of rollers. The four primary transfer rollers 12 serve as primary transferors that transfer yellow, magenta, cyan, and black toner images formed on the photoconductors 2 onto the intermediate transfer belt 11, respectively, thus forming a full color toner image on the intermediate transfer belt 11. The secondary transfer roller 13 serves as a secondary transferor that transfers the full color toner image formed on the intermediate transfer belt 11 onto the sheet P. The plurality of primary transfer rollers 12 is pressed against the photoconductors 2, respectively, via the intermediate transfer belt 11. Thus, the intermediate transfer belt 11 contacts each of the photoconductors 2, forming a primary transfer nip therebetween. On the other hand, the secondary transfer roller 13 is pressed against one of the rollers across which the intermediate transfer belt 11 is stretched taut via the intermediate transfer belt 11. Thus, a secondary transfer nip is formed between the secondary transfer roller 13 and the intermediate transfer belt 11.

The image forming apparatus 100 accommodates a sheet conveyance path 14 through which the sheet P fed from the sheet feeding device 7 is conveyed. A timing roller pair 15 is disposed in the sheet conveyance path 14 at a position between the sheet feeding device 7 and the secondary transfer nip defined by the secondary transfer roller 13.

Referring to FIG. 1, a description is provided of printing processes performed by the image forming apparatus 100 having the construction described above.

When the image forming apparatus 100 receives an instruction to start printing, a driver drives and rotates the photoconductor 2 clockwise in FIG. 1 in each of the image forming units 1Y, 1M, 1C, and 1Bk. The charger 3 charges the surface of the photoconductor 2 uniformly at a high electric potential. Subsequently, the exposure device 6 exposes the surface of each of the photoconductors 2 based on image data created by an original scanner that reads an image on an original or print data instructed by a terminal, thus decreasing the electric potential of an exposed portion on the photoconductor 2 and forming an electrostatic latent image on the photoconductor 2. The developing device 4 supplies toner to the electrostatic latent image formed on the photoconductor 2, forming a toner image thereon.

When the toner images formed on the photoconductors 2 reach the primary transfer nips defined by the primary transfer rollers 12 in accordance with rotation of the photoconductors 2, respectively, the toner images formed on the photoconductors 2 are transferred onto the intermediate transfer belt 11 driven and rotated counterclockwise in FIG. 1 successively such that the toner images are superimposed on the intermediate transfer belt 11, forming a full color toner image thereon. Thereafter, the full color toner image formed on the intermediate transfer belt 11 is conveyed to the secondary transfer nip defined by the secondary transfer roller 13 in accordance with rotation of the intermediate transfer belt 11 and is transferred onto a sheet P conveyed to the secondary transfer nip. The sheet P is supplied from the sheet feeding device 7. The timing roller pair 15 temporarily halts the sheet P supplied from the sheet feeding device 7. Thereafter, the timing roller pair 15 conveys the sheet P to the secondary transfer nip at a time when the full color toner image formed on the intermediate transfer belt 11 reaches the secondary transfer nip. Accordingly, the full color toner image is transferred onto and borne on the sheet P. After the toner image is transferred onto the intermediate transfer belt 11, the cleaner 5 removes residual toner remained on the photoconductor 2 therefrom.

The sheet P transferred with the full color toner image is conveyed to the fixing device 9 that fixes the full color toner image on the sheet P. Thereafter, the sheet ejection device 10 ejects the sheet P onto the outside of the image forming apparatus 100, thus finishing a series of printing processes.

A description is provided of a construction of the fixing device 9.

Figure 2:
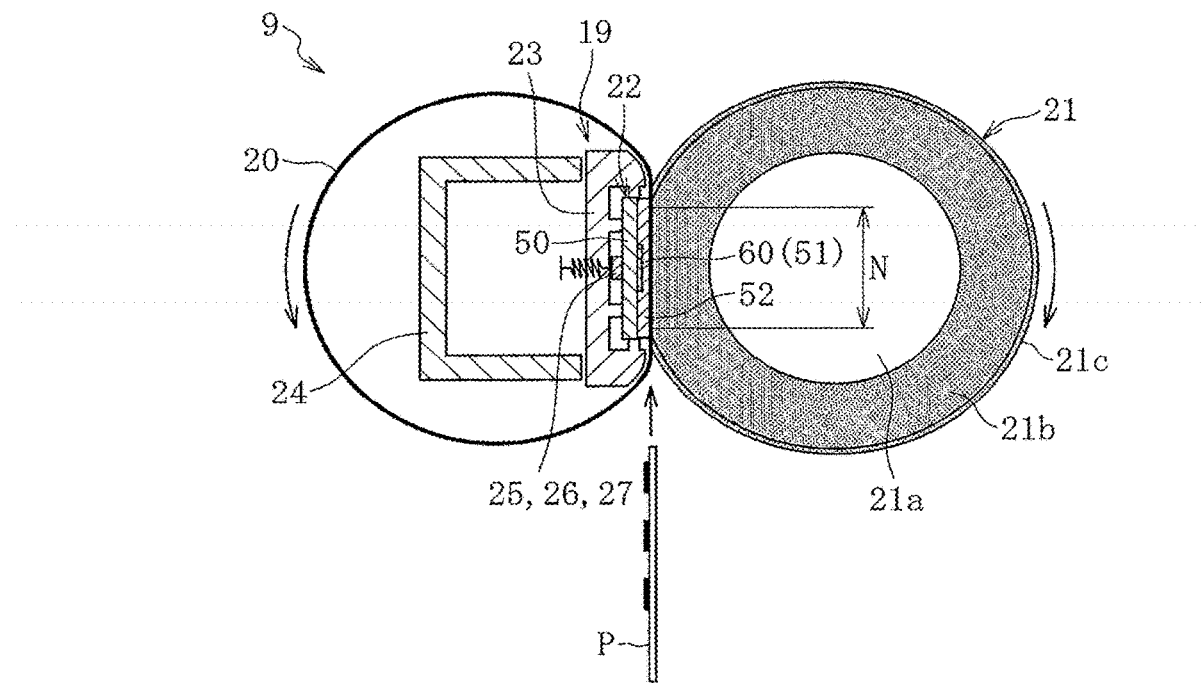
FIG. 2 is a schematic cross-sectional view of a fixing device incorporated in the image forming apparatus depicted in FIG. 1.

As illustrated in FIG. 2, the fixing device 9 according to this embodiment includes a fixing belt 20, a pressure roller 21, and a heating device 19. The fixing belt 20 is an endless belt serving as a fixing rotator or a fixing member. The pressure roller 21 serves as an opposed rotator or an opposed member that is disposed opposite an outer circumferential surface of the fixing belt 20. The heating device 19 heats the fixing belt 20. The heating device 19 includes a heater 22, a heater holder 23, a stay 24, and a plurality of thermistors, that is, a first thermistor 25, a second thermistor 26, and a third thermistor 27. The heater 22 is a laminated heater and serves as a heater or a heating member. The heater holder 23 serves as a heater holder that holds or supports the heater 22. The stay 24 serves as a reinforcement that reinforces the heater holder 23 throughout an entire width of the heater holder 23 in a longitudinal direction thereof. Each of the first thermistor 25, the second thermistor 26, and the third thermistor 27 serves as a temperature detector.

A detailed description is now given of a construction of the fixing belt 20.

The fixing belt 20 includes a tubular base that is made of polyimide (PI) and has an outer diameter of 25 mm and a thickness in a range of from 40 micrometers to 120 micrometers, for example. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE), and has a thickness in a range of from 5 micrometers to 50 micrometers to enhance durability of the fixing belt 20 and facilitate separation of the sheet P and a foreign substance from the fixing belt 20. Optionally, an elastic layer that is made of rubber or the like and has a thickness in a range of from 50 micrometers to 500 micrometers may be interposed between the base and the release layer. The base of the fixing belt 20 may be made of heat resistant resin such as polyetheretherketone (PEEK) or metal such as nickel (Ni) and SUS stainless steel, instead of polyimide. An inner circumferential surface of the fixing belt 20 may be coated with polyimide, PTFE, or the like to produce a slide layer.

A detailed description is now given of a construction of the pressure roller 21.

The pressure roller 21 has an outer diameter of 25 mm, for example. The pressure roller 21 includes a cored bar 21a, an elastic layer 21b, and a release layer 21c. The cored bar 21a is solid and made of metal such as iron. The elastic layer 21b is disposed on a surface (e.g., an outer periphery) of the cored bar 21a. The release layer 21c coats an outer surface (e.g., an outer periphery) of the elastic layer 21b. The elastic layer 21b is made of silicone rubber and has a thickness of 3.5 mm, for example. In order to facilitate separation of the sheet P and the foreign substance from the pressure roller 21, the release layer 21c that is made of fluororesin and has a thickness of about 40 micrometers, for example, is preferably disposed on the outer surface of the elastic layer 21b. Alternatively, instead of the pressure roller 21, an endless pressure belt or the like may be employed as an opposed rotator that is disposed opposite the outer circumferential surface of the fixing belt 20.

A detailed description is now given of a construction of the heater 22.

The heater 22 heats the fixing belt 20 serving as a heated member. The heater 22 extends in a longitudinal direction thereof throughout an entire width of the fixing belt 20 in a width direction, that is, an axial direction, of the fixing belt 20. The heater 22 contacts the inner circumferential surface of the fixing belt 20. The heater 22 may not contact the fixing belt 20 or may be disposed opposite the fixing belt 20 indirectly via a low friction sheet or the like. However, the heater 22 that contacts the fixing belt 20 directly enhances conduction of heat from the heater 22 to the fixing belt 20. The heater 22 may contact the outer circumferential surface of the fixing belt 20. However, if the outer circumferential surface of the fixing belt 20 is brought into contact with the heater 22 and damaged, the fixing belt 20 may degrade quality of fixing the toner image on the sheet P. Hence, the heater 22 contacts the inner circumferential surface of the fixing belt 20 advantageously.

The heater 22 includes a base layer 50, a conductor layer 51, and an insulating layer 52. The conductor layer 51 includes a heat generator 60. The base layer 50, the conductor layer 51, and the insulating layer 52 are layered in this order from a side of the heater 22, that faces the heater holder 23 to a side of the heater 22, that faces the fixing nip N.

A detailed description is now given of a construction of the heater holder 23 and the stay 24.

The heater holder 23 and the stay 24 are disposed inside a loop formed by the fixing belt 20. The stay 24 includes a channel made of metal. Both lateral ends of the stay 24 in a longitudinal direction thereof are supported by side walls (e.g., side plates) of the fixing device 9, respectively. The stay 24 supports a stay side face of the heater holder 23, that faces the stay 24 and is opposite a heater side face of the heater holder 23, that faces the heater 22. Accordingly, the stay 24 retains the heater 22 and the heater holder 23 to be immune from being bent substantially by pressure from the pressure roller 21, forming a fixing nip N between the fixing belt 20 and the pressure roller 21.

Since the heater holder 23 is subject to temperature increase by heat from the heater 22, the heater holder 23 is preferably made of a heat resistant material. For example, if the heater holder 23 is made of heat resistant resin having a decreased thermal conductivity, such as liquid crystal polymer (LCP) and PEEK, the heater holder 23 suppresses conduction of heat thereto from the heater 22, facilitating heating of the fixing belt 20.

A spring serving as a pressing member causes the fixing belt 20 and the pressure roller 21 to press against each other. Thus, the fixing nip N is formed between the fixing belt 20 and the pressure roller 21. As a driving force is transmitted to the pressure roller 21 from a driver disposed inside the body 103 of the image forming apparatus 100, the pressure roller 21 serves as a driving roller that drives and rotates the fixing belt 20. The fixing belt 20 is driven and rotated by the pressure roller 21 as the pressure roller 21 rotates. While the fixing belt 20 rotates, the fixing belt 20 slides over the heater 22. In order to facilitate sliding of the fixing belt 20, a lubricant such as oil and grease may be interposed between the heater 22 and the fixing belt 20.

When printing starts, the driver drives and rotates the pressure roller 21 and the fixing belt 20 starts rotation in accordance with rotation of the pressure roller 21. Additionally, as power is supplied to the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure.

Figure 3:
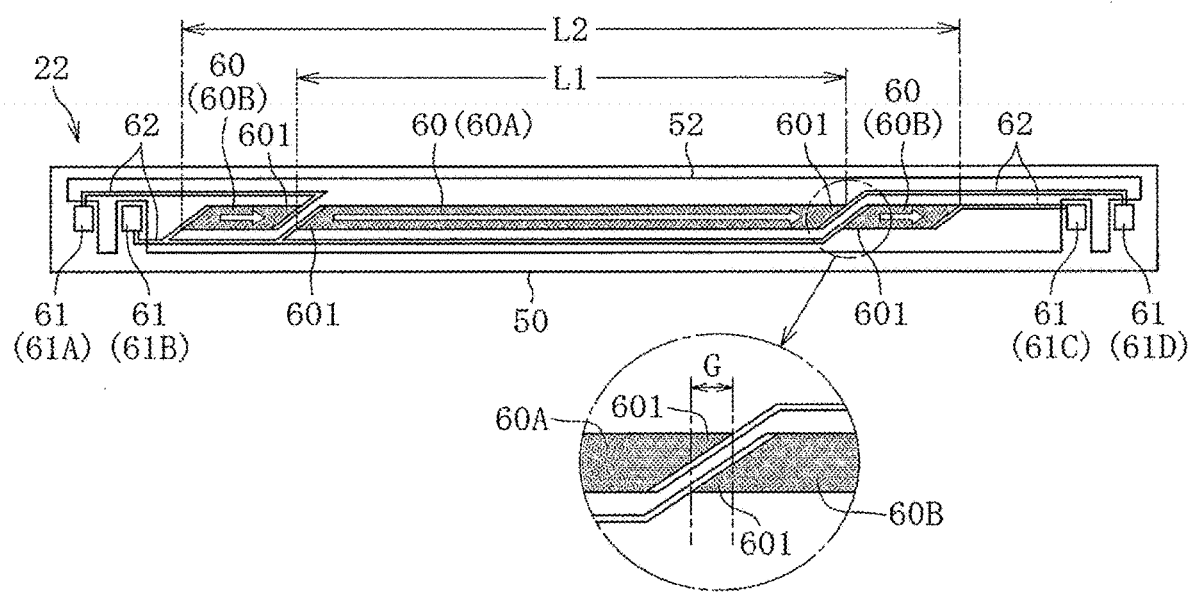
FIG. 3 is a plan view of a heater incorporated in the fixing device depicted in FIG. 2.
Figure 4:
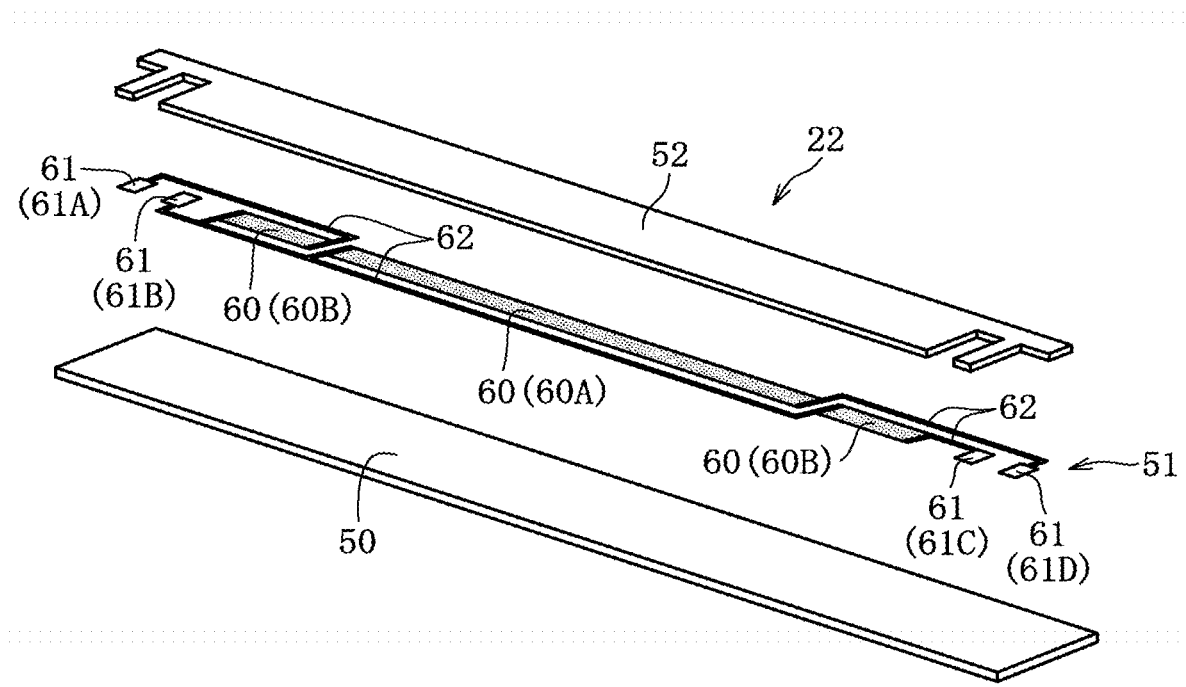
FIG. 4 is an exploded perspective view of the heater depicted in FIG. 3.

FIG. 3 is a plan view of the heater 22. FIG. 4 is an exploded perspective view of the heater 22. Hereinafter, a front side of the heater 22 defines a side that faces the fixing belt 20 and the fixing nip N. A back side of the heater 22 defines a side that faces the heater holder 23.

As illustrated in FIG. 4, the heater 22 includes a plurality of layers, that is, the base layer 50, the conductor layer 51, and the insulating layer 52. The base layer 50 is platy. The conductor layer 51 is mounted on the front side of the base layer 50. The insulating layer 52 coats the front side of the conductor layer 51. The conductor layer 51 includes the heat generator 60, a plurality of electrodes 61, and a plurality of feeders 62. The heat generator 60 includes a plurality of heat generating portions, that is, a center heat generating portion 60A and lateral end heat generating portions 60B. Each of the center heat generating portion 60A and the lateral end heat generating portions 60B includes a laminated, resistive heat generator. The electrodes 61 are disposed on both lateral ends of the base layer 50, respectively, in a longitudinal direction thereof. Each of the feeders 62 connects the electrode 61 to the heat generator 60. As illustrated in FIG. 3, at least a part of each of the electrodes 61 is not coated with the insulating layer 52 and is exposed so that the electrodes 61 are connected to a connector described below.

The base layer 50 is made of an insulating material, for example, ceramic such as alumina and aluminum nitride, glass, or the like. Alternatively, the base layer 50 may be made of metal such as stainless steel (e.g., SUS stainless steel), iron, copper, and aluminum. A separate insulating layer may be interposed between the base layer 50 and the conductor layer 51 to ensure insulation. Since metal has an enhanced durability against rapid heating and is processed readily, metal is preferably used to reduce manufacturing costs. Among metals, aluminum and copper are preferable because aluminum and copper attain an increased thermal conductivity and barely suffer from uneven temperature. Stainless steel is advantageous because stainless steel is manufactured at reduced costs compared to aluminum and copper.

The insulating layer 52 is made of heat resistant glass. Alternatively, the insulating layer 52 may be made of ceramic, PI, or the like.

For example, the heat generator 60 is produced as below. Silver-palladium (AgPd), glass powder, and the like are mixed into paste. The paste coats the base layer 50 by screen printing or the like. Thereafter, the base layer 50 is subject to firing. Alternatively, the heat generator 60 may be made of a resistive material such as a silver alloy (AgPt) and ruthenium oxide ($RuO_2$).

The feeders 62 are made of a conductor having a resistance value smaller than a resistance value of the heat generator 60. The feeders 62 and the electrodes 61 are made of a material prepared with silver (Ag), silver-palladium (AgPd), or the like by screen printing or the like.

According to this embodiment, the heat generator 60 is disposed on the front side of the base layer 50. Conversely, the heat generator 60 may be disposed on the back side of the base layer 50. In this case, heat generated by the heat generator 60 is conducted to the fixing belt 20 through the base layer 50. Hence, the base layer 50 is preferably made of a material having an increased thermal conductivity, such as aluminum nitride. The base layer 50 made of the material having the increased thermal conductivity heats the fixing belt 20 sufficiently, even if the heat generator 60 is disposed on the back side of the base layer 50.

According to this embodiment, the heat generator 60, the electrodes 61, and the feeders 62 are made of an alloy of silver, palladium, or the like to attain a positive temperature coefficient (PTC) property, that is, a property of temperature coefficient of resistance. The PTC property defines a property in which the resistance value increases as the temperature increases, for example, a heater output decreases under a given voltage. The heat generator 60 having the PTC property starts quickly with an increased output at low temperatures and suppresses overheating with a decreased output at high temperatures. For example, if a temperature coefficient of resistance (TCR) of the PTC property is in a range of from about 300 ppm/° C. to about 4,000 ppm/° C., the heater 22 is manufactured at reduced costs while retaining a resistance value needed for the heater 22. The TCR is preferably in a range of from about 500 ppm/° C. to about 2,000 ppm/° C. The TCR is calculated by measuring the resistance value at 25 degrees Celsius and 125 degrees Celsius. For example, if the temperature increases by 100 degrees Celsius and the resistance value increases by 10%, the TCR is 1,000 ppm/° C.

According to this embodiment, the heat generator 60 includes three heat generating portions arranged in the longitudinal direction of the base layer 50. One of the three heat generating portions is the center heat generating portion 60A serving as a primary heat generator disposed at a center of the base layer 50 in the longitudinal direction thereof. Remaining two of the three heat generating portions are the lateral end heat generating portions 60B serving as secondary heat generators that sandwich the center heat generating portion 60A in the longitudinal direction of the base layer 50. A controller controls the center heat generating portion 60A and the lateral end heat generating portions 60B to generate heat separately from each other.

As illustrated in FIG. 3, the plurality of electrodes 61 includes a first electrode 61A, a second electrode 61B, a third electrode 61C, and a fourth electrode 61D, which are arranged in this order from left to right in FIG. 3. When the second electrode 61B and the fourth electrode 61D are applied with a voltage, the center heat generating portion 60A generates heat. When the first electrode 61A and the second electrode 61B are applied with a voltage, the left, lateral end heat generating portion 60B in FIG. 3 generates heat. When the second electrode 61B and the third electrode 61C are applied with a voltage, the right, lateral end heat generating portion 60B in FIG. 3 generates heat. If the first electrode 61A and the third electrode 61C are connected in parallel in an outside of the heater 22 and configured to be applied with a voltage simultaneously, when the first electrode 61A, the third electrode 61C, and the second electrode 61B are applied with a voltage, both the lateral end heat generating portions 60B generate heat simultaneously. Arrows in FIG. 3 indicate directions in which an electric current flows in longitudinal directions of the center heat generating portion 60A and the lateral end heat generating portions 60B, respectively.

If a width of a sheet P conveyed through the fixing device 9 is equivalent to a width span L1 of the center heat generating portion 60A or smaller in the longitudinal direction of the heater 22, the center heat generating portion 60A generates heat. If a width of a sheet P conveyed through the fixing device 9 is greater than the width span L1 of the center heat generating portion 60A in the longitudinal direction of the heater 22, the center heat generating portion 60A and the lateral end heat generating portions 60B generate heat. Thus, the heater 22 changes a heat generating span in the longitudinal direction thereof according to a conveyance span where the sheet P is conveyed, that is, a width of the sheet P. The width span L1 of the center heat generating portion 60A is equivalent to a width of a small sheet P, for example, a width of 215 mm of an A4 size sheet in portrait orientation. A width span L2 of a heat generating span defines a combined width of a width of one lateral end heat generating portion 60B, a width of the center heat generating portion 60A, and a width of another lateral end heat generating portion 60B in the longitudinal direction of the heater 22. The width span L2 is equivalent to a width of a large sheet P, for example, a width of 301 mm of an A3 size sheet in portrait orientation. Accordingly, when the small sheet P or the large sheet P is conveyed, the heater 22 barely suffers from overheating in a non-conveyance span where the small sheet P or the large sheet P is not conveyed. That is, the non-conveyance span is barely produced on the center heat generating portion 60A and the lateral end heat generating portions 60B. Consequently, the heater 22 improves productivity in printing.

As illustrated in FIG. 3, according to this embodiment, each of the center heat generating portion 60A and the lateral end heat generating portions 60B includes slopes 601 disposed at both lateral ends thereof, respectively. The slopes 601 are inclined relative to a sheet conveyance direction, that is, a vertical direction in FIG. 3, in which the sheet P is conveyed. At least a part of one of the slopes 601 overlaps at least a part of an adjacent one of the slopes 601 in the longitudinal direction of the heater 22, that is, a horizontal direction in FIG. 3. For example, as illustrated in an enlarged view in FIG. 3, the part of one of the slopes 601 and the part of the adjacent one of the slopes 601 are disposed in an identical overlap span G in the longitudinal direction of the heater 22. Accordingly, the slopes 601 that overlap each other suppress temperature decrease in a gap between the center heat generating portion 60A and each of the lateral end heat generating portions 60B and thereby decrease variation in fixing the toner image on the sheet P in a width direction thereof.

Figure 5:
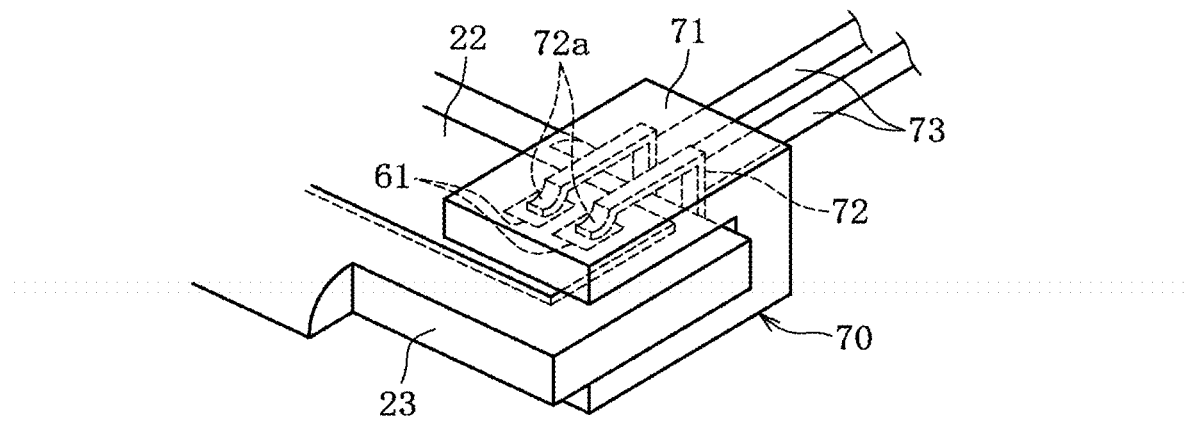
FIG. 5 is a perspective view of the heater and a heater holder incorporated in the fixing device depicted in FIG. 2, illustrating a connector attached to the heater and the heater holder.

FIG. 5 is a perspective view of the heater 22 and the heater holder 23, illustrating a connector 70 attached thereto.

As illustrated in FIG. 5, the connector 70 includes a housing 71 made of resin and a contact terminal 72 anchored to the housing 71. The contact terminal 72 is a flat spring. The contact terminal 72 includes a pair of contacts 72a that contacts the electrodes 61 of the heater 22, respectively. The contact terminal 72 of the connector 70 is coupled to a harness 73 (e.g., a lead wire and a conducting wire) that supplies power.

As illustrated in FIG. 5, the connector 70 is attached to the heater 22 and the heater holder 23 such that the connector 70 sandwiches the heater 22 and the heater holder 23 together at the front side and the back side, respectively. Accordingly, each of the contacts 72a of the contact terminal 72 resiliently contacts or presses against the electrode 61 of the heater 22. Consequently, the heat generator 60 is electrically connected to a power supply disposed in the image forming apparatus 100 through the connector 70, allowing the power supply to supply power to the heat generator 60. According to this embodiment, the connector 70 serving as a feeding member that supplies power also serves as a sandwiching member that sandwiches and holds the heater 22 and the heater holder 23 together. Hence, a sandwiching member is not provided separately, decreasing the number of parts of the fixing device 9. Although FIG. 5 illustrates the connector 70 attached to one lateral end of the heater 22 in the longitudinal direction thereof, another connector 70 is similarly attached to another lateral end of the heater 22 in the longitudinal direction thereof.

Figure 6:
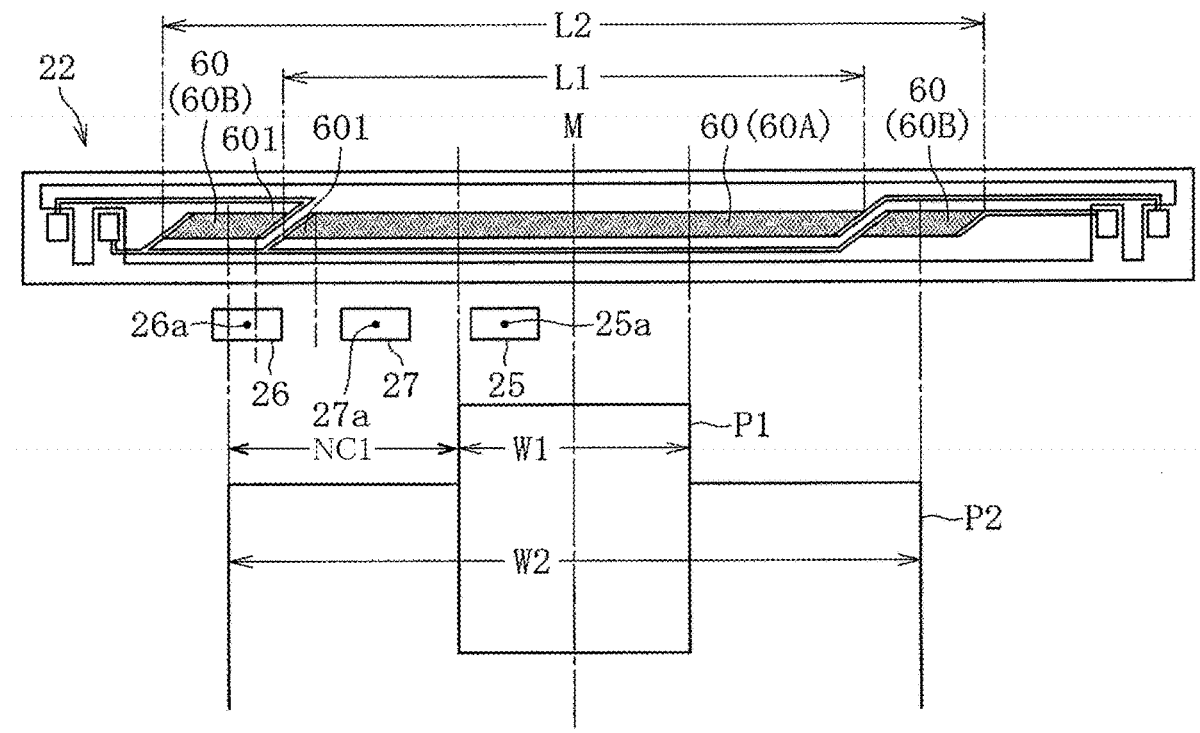
FIG. 6 is a diagram illustrating a positional relation between thermistors, a heat generator, and conveyance spans of the fixing device depicted in FIG. 2.

FIG. 6 is a diagram illustrating a positional relation between thermistors (e.g., the first thermistor 25, the second thermistor 26, and the third thermistor 27), the heat generator 60 (e.g., the center heat generating portion 60A and the lateral end heat generating portions 60B), and conveyance spans W1 and W2.

In FIG. 6, the conveyance span W1 defines a conveyance span in the longitudinal direction of the heater 22, where a small sheet P1 is conveyed through the fixing nip N. The small sheet P1 has a width smaller than the width span L1 of the center heat generating portion 60A in the longitudinal direction thereof. The conveyance span W2 defines a conveyance span in the longitudinal direction of the heater 22, where a large sheet P2 is conveyed through the fixing nip N. The large sheet P2 has a width greater than the width span L1 of the center heat generating portion 60A in the longitudinal direction thereof.

The first thermistor 25 includes a temperature detecting portion 25a disposed within the width span L1 of the center heat generating portion 60A and the conveyance span W1 where the small sheet P1 is conveyed. Since the temperature detecting portion 25a of the first thermistor 25 is disposed within the width span L1 of the center heat generating portion 60A and the conveyance span W1 of the small sheet P1, when the small sheet P1 and sheets P having widths greater than the width of the small sheet P1 are conveyed, the first thermistor 25 detects the temperature of the center heat generating portion 60A in a conveyance span where the small sheet P1 and the sheets P greater than the small sheet P1 are conveyed. If a plurality of sizes of sheets P that have widths smaller than the width span L1 of the center heat generating portion 60A is available for the fixing device 9, the temperature detecting portion 25a of the first thermistor 25 is disposed within a conveyance span of a sheet P having a minimum width of the widths of the plurality of sizes of the sheets P. Accordingly, the first thermistor 25 detects the temperature of the center heat generating portion 60A in conveyance spans of the sheets P of the plurality of sizes as the sheets P are conveyed over the center heat generating portion 60A.

The second thermistor 26 includes a temperature detecting portion 26a disposed outboard from the width span L1 of the center heat generating portion 60A in the longitudinal direction thereof and within the conveyance span W2 where the large sheet P2 is conveyed. For example, the temperature detecting portion 26a of the second thermistor 26 is disposed within the conveyance span W2 where the large sheet P2 is conveyed over the lateral end heat generating portions 60B. Since the temperature detecting portion 26a of the second thermistor 26 is disposed outboard from the width span L1 of the center heat generating portion 60A and within the conveyance span W2 where the large sheet P2 is conveyed, when the large sheet P2 is conveyed, the second thermistor 26 detects the temperature of the lateral end heat generating portion 60B in the conveyance span W2 where the large sheet P2 is conveyed. If a plurality of sizes of sheets P that are conveyed over the lateral end heat generating portions 60B is available for the fixing device 9, the temperature detecting portion 26a of the second thermistor 26 is disposed within a conveyance span of a sheet P having a minimum width of widths of the plurality of sizes of the sheets P. Accordingly, the second thermistor 26 detects the temperature of the lateral end heat generating portion 60B in conveyance spans of the sheets P of the plurality of sizes as the sheets P are conveyed over the lateral end heat generating portions 60B.

The third thermistor 27 includes a temperature detecting portion 27a disposed outboard from the conveyance span W1 of the small sheet P1 in the longitudinal direction of the heater 22 and within the width span L1 of the center heat generating portion 60A. For example, the temperature detecting portion 27a of the third thermistor 27 is disposed in a non-conveyance span (e.g., a non-passage span) where the small sheet P1 is not conveyed over the center heat generating portion 60A. Since the temperature detecting portion 27a of the third thermistor 27 is disposed outboard from the conveyance span W1 of the small sheet P1 in the longitudinal direction of the heater 22 and within the width span L1 of the center heat generating portion 60A, when the small sheet P1 is conveyed, the third thermistor 27 detects the temperature of the heater 22 in a non-conveyance span NC1 of the center heat generating portion 60A where the small sheet P1 is not conveyed.

Information about temperatures detected by the first thermistor 25, the second thermistor 26, and the third thermistor 27 is sent to the controller that controls heat generation of the center heat generating portion 60A and the lateral end heat generating portions 60B. The controller controls the center heat generating portion 60A and the lateral end heat generating portions 60B separately based on the information sent to the controller. Thus, the controller controls the center heat generating portion 60A and the lateral end heat generating portions 60B to generate heat to heat the fixing belt 20 to a predetermined target temperature (e.g., a fixing temperature) at the fixing nip N. However, when heat generated by the heater 22 is barely consumed in the non-conveyance span NC1, for example, when a plurality of small sheets P1 is conveyed continuously, the temperature of the fixing belt 20 in the non-conveyance span NC1 may increase excessively. In this case, the third thermistor 27 detects that the temperature of the center heat generating portion 60A in the non-conveyance span NC1 is a predetermined temperature or higher, so that the controller controls the heater 22 to generate heat in a decreased amount. Additionally, temperature increase (e.g., overheating) in the non-conveyance span NC1 is suppressed by decreasing a conveyance speed at which the sheets P are conveyed, increasing an interval with which the sheets P are conveyed, or interrupting image formation.

According to this embodiment, the slopes 601 are disposed at both lateral ends of each of the center heat generating portion 60A and the lateral end heat generating portions 60B in the longitudinal directions thereof, respectively. The slopes 601 may be susceptible to a decreased amount of heat generation compared to other portion (e.g., a center portion in the longitudinal direction) of each of the center heat generating portion 60A and the lateral end heat generating portions 60B. Hence, if the temperature detecting portions 26a and 27a of the second thermistor 26 and the third thermistor 27, respectively, are disposed opposite the slopes 601, the temperature detecting portions 26a and 27a may detect the temperature of the lateral end heat generating portion 60B and the center heat generating portion 60A with a degraded accuracy. To address this circumstance, as illustrated in FIG. 6, the temperature detecting portions 26a and 27a of the second thermistor 26 and the third thermistor 27, respectively, are preferably disposed opposite portions of the lateral end heat generating portion 60B and the center heat generating portion 60A other than the slopes 601, for example, the center portions of the lateral end heat generating portion 60B and the center heat generating portion 60A in the longitudinal direction thereof, respectively. Accordingly, the second thermistor 26 and the third thermistor 27 detect the temperature of the lateral end heat generating portion 60B and the center heat generating portion 60A, respectively, with an improved accuracy.

According to this embodiment, the second thermistor 26 is disposed opposite one of the lateral end heat generating portions 60B. Alternatively, another second thermistor 26 may also be disposed opposite another one of the lateral end heat generating portions 60B. However, according to this embodiment, the image forming apparatus 100 employs a center conveyance method in which the small sheet P1 and the large sheet P2 of difference sizes are conveyed in a state in which the small sheet P1 and the large sheet P2 are centered at a center position M in the longitudinal direction of the heater 22, that is, a width direction of the small sheet P1 and the large sheet P2. In this case, a temperature distribution of the fixing belt 20 is basically symmetric with respect to the center position M of the small sheet P1 and the large sheet P2 in the width direction thereof. Accordingly, if the second thermistor 26 is disposed opposite one of the lateral end heat generating portions 60B, the controller also controls another one of the lateral end heat generating portions 60B similarly.

A description is provided of a construction of each of the first thermistor 25, the second thermistor 26, and the third thermistor 27.

Since the first thermistor 25, the second thermistor 26, and the third thermistor 27 have similar constructions, respectively, the following describes a construction of one of the first thermistor 25, the second thermistor 26, and the third thermistor 27, that is, the first thermistor 25.

Figure 7:
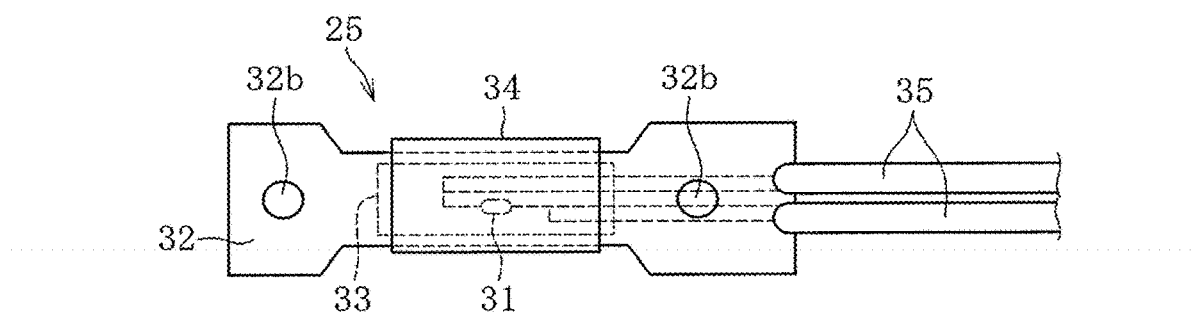
FIG. 7 is a plan view of the thermistor incorporated in the fixing device depicted in FIG. 2.
Figure 8:
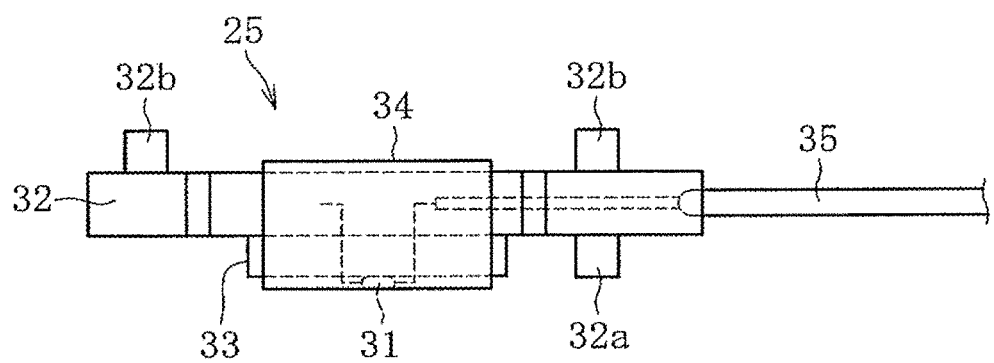
FIG. 8 is a side view of the thermistor depicted in FIG. 7.

FIG. 7 is a plan view of the first thermistor 25. FIG. 8 is a side view of the first thermistor 25.

As illustrated in FIGS. 7 and 8, the first thermistor 25 includes a temperature detecting element 31, a holding body 32, a cushioning member 33, an insulating sheet 34, and lead wires 35. The temperature detecting element 31 serves as the temperature detecting portion 25a. The holding body 32 holds or supports the temperature detecting element 31. The cushioning member 33 is interposed between the temperature detecting element 31 and the holding body 32. The insulating sheet 34 coats or covers the temperature detecting element 31. The lead wires 35 are two conductors electrically connected to the temperature detecting element 31.

The temperature detecting element 31 is electrically connected to the controller that controls heat generation of the heater 22 through the two lead wires 35. The temperature detecting element 31 and the cushioning member 33 are mounted on a lower face of the holding body 32 in FIG. 8.

According to this embodiment, the holding body 32 is an elongate member elongated in one direction (e.g., a horizontal direction in FIGS. 7 and 8). The temperature detecting element 31 and the cushioning member 33 are disposed on a center portion of the holding body 32 in a longitudinal direction thereof. As illustrated in FIG. 7, the holding body 32 according to this embodiment includes the center portion and both lateral end portions in the longitudinal direction thereof. A width of the center portion of the holding body 32 is smaller than a width of each of the lateral end portions of the holding body 32 in a direction perpendicular to the longitudinal direction of the holding body 32. The temperature detecting element 31 and the cushioning member 33 are disposed on the center portion of the holding body 32, that has the smaller width.

The holding body 32 includes a heater holder side face that mounts the temperature detecting element 31 and the cushioning member 33. The heater holder side face of the holding body 32 further mounts a projecting engagement 32a that positions the holding body 32 with respect to the heater holder 23 serving as a counterpart. The projecting engagement 32a is disposed on one of the lateral end portions of the holding body 32 in the longitudinal direction thereof, from which the lead wires 35 are exposed.

Two projections 32b are mounted on an upper face of the holding body 32 in FIG. 8, thus being projected from the holding body 32. The projections 32b position coil springs described below. A single projection 32b is disposed on each of the lateral end portions of the holding body 32 in the longitudinal direction thereof.

The insulating sheet 34 is attached such that the insulating sheet 34 wraps the temperature detecting element 31, the holding body 32, and the cushioning member 33. The insulating sheet 34 is made of resin that improves insulation, heat resistance, abrasion resistance, and thermal conductivity, such as polyimide. The holding body 32 is made of a resin material that improves heat resistance, such as LCP. If the cushioning member 33 is requested to have an increased heat resistance, the cushioning member 33 preferably employs inorganic fiber paper made of ceramic fiber sheet or heat resistant non-woven fabric. Conversely, if the cushioning member 33 is not requested to have an increased heat resistance, the cushioning member 33 may employ rubber, sponge, and the like that are made of silicone resin or fluoro resin.

Figure 9:
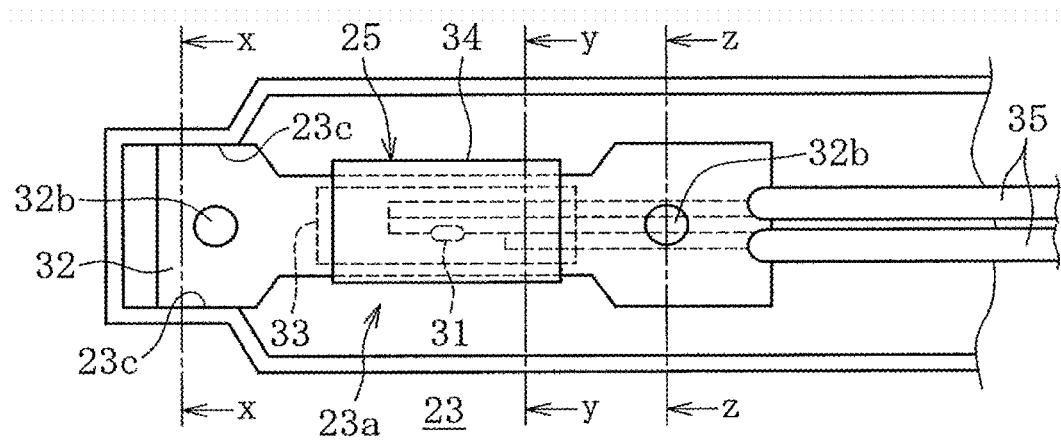
FIG. 9 is a plan view of the thermistor depicted in FIG. 7, illustrating attachment of the thermistor.
Figure 10:
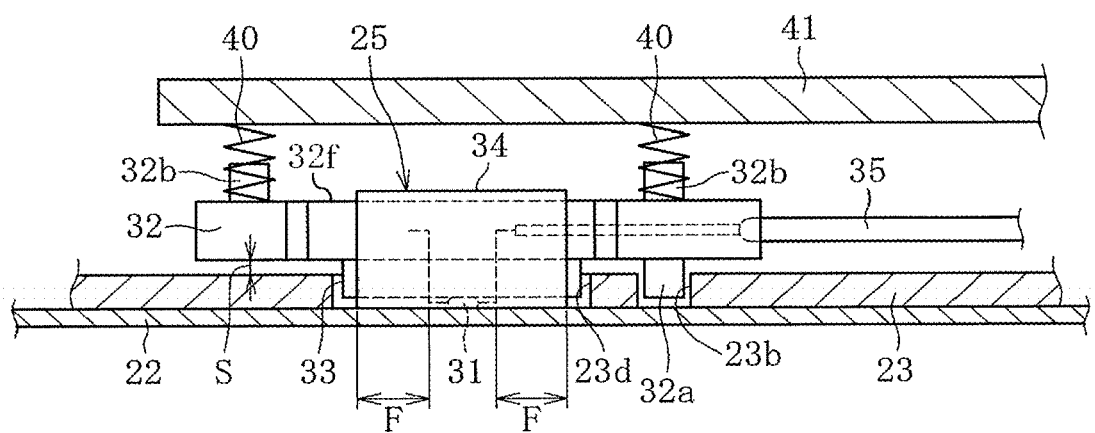
FIG. 10 is a side view of the thermistor depicted in FIG. 7, illustrating attachment of the thermistor.
Figure 11:
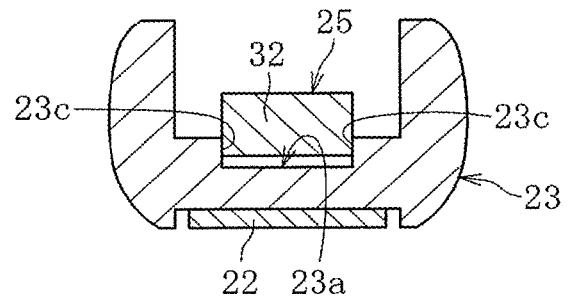
FIG. 11 is a cross-sectional view of the thermistor depicted in FIG. 9, taken on line x-x in FIG. 9.
Figure 12:
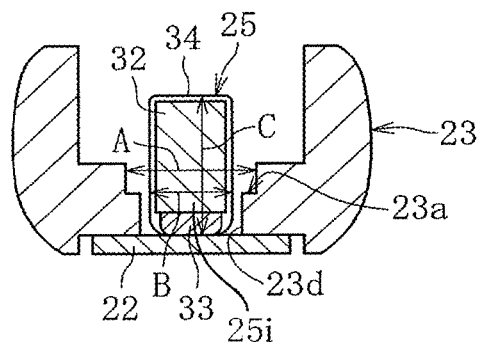
FIG. 12 is a cross-sectional view of the thermistor depicted in FIG. 9, taken on line y-y in FIG. 9.
Figure 13:
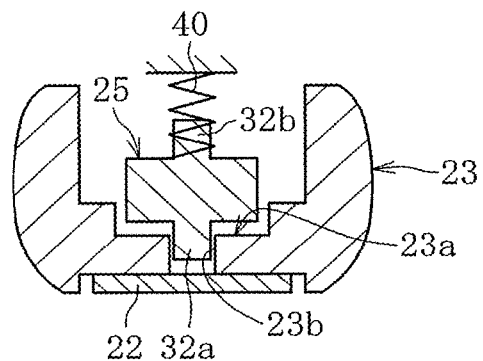
FIG. 13 is a cross-sectional view of the thermistor depicted in FIG. 9, taken on line z-z in FIG. 9.

FIGS. 9 to 13 illustrate the first thermistor 25 attached to the heater holder 23 serving as a counterpart. FIG. 9 is a plan view of the first thermistor 25 attached to the heater holder 23. FIG. 10 is a side view of the first thermistor 25 attached to the heater holder 23. FIG. 11 is a cross-sectional view of the first thermistor 25, taken on line x-x in FIG. 9. FIG. 12 is a cross-sectional view of the first thermistor 25, taken on line y-y in FIG. 9. FIG. 13 is a cross-sectional view of the first thermistor 25, taken on line z-z in FIG. 9. Since the first thermistor 25, the second thermistor 26, and the third thermistor 27 have similar constructions for attachment, respectively, the following describes a construction for attachment of one of the first thermistor 25, the second thermistor 26, and the third thermistor 27, that is, the first thermistor 25.

As illustrated in FIG. 9, the first thermistor 25 is placed in an accommodating portion 23a (e.g., an accommodating section) of the heater holder 23. The accommodating portion 23a is a frame or a groove, for example. As illustrated in FIGS. 10 and 13, the projecting engagement 32a of the first thermistor 25 is inserted into a hole 23b of the heater holder 23, restricting motion of the first thermistor 25 with respect to the heater holder 23. For example, the projecting engagement 32a engages the hole 23b, restricting motion of the first thermistor 25 in a direction perpendicular to an axial direction or a projecting direction of the projecting engagement 32a.

As illustrated in FIGS. 9 and 11, in a state in which the accommodating portion 23a accommodates the first thermistor 25, one lateral end portion of the holding body 32, that is opposite another lateral end portion of the holding body 32, that mounts the projecting engagement 32a, engages opposed side wall faces 23c of the accommodating portion 23a, restricting rotation of the first thermistor 25 about the projecting engagement 32a. Accordingly, motion and rotation of the first thermistor 25 with respect to the heater holder 23 are restricted, thus positioning the first thermistor 25. Each of the projecting engagement 32a and the hole 23b defines a circle in cross section. Alternatively, each of the projecting engagement 32a and the hole 23b may define a triangle, a square, or other polygons in cross section. Each of the projecting engagement 32a and the hole 23b that defines a polygon in cross section restricts rotation of the first thermistor 25 about the projecting engagement 32a.

As illustrated in FIGS. 10 and 12, the heater holder 23 includes a through hole 23d separately from the hole 23b. The temperature detecting element 31 and peripheral portions thereof are disposed in the through hole 23d. As the temperature detecting element 31 and the peripheral portions including the cushioning member 33 and the insulating sheet 34 are disposed in the through hole 23d, the temperature detecting element 31 is disposed opposite or pressed against the heater 22 via the insulating sheet 34. Alternatively, an enhanced thermal conductor made of aluminum, graphite, or the like may be interposed between the first thermistor 25 and the heater 22. The temperature detecting element 31 may be disposed opposite or pressed against the heater 22 via the enhanced thermal conductor or via the enhanced thermal conductor and the insulating sheet 34.

As illustrated in FIG. 10, a support 41 supports a pair of coil springs 40 serving as a pair of biasing members that biases the first thermistor 25. The support 41 may be the stay 24 or other member that is different from the stay 24 and is attached to the heater holder 23 or the like. As the pair of coil springs 40 biases the first thermistor 25 against the heater 22 and the heater holder 23, the temperature detecting element 31 is pressed against the heater 22 with a predetermined pressure.

The projections 32b are mounted on a biased face 32f of the holding body 32, that is biased by the coil springs 40. The two projections 32b of the first thermistor 25 position the coil springs 40, respectively, at one end of each of the coil springs 40. Each of the projections 32b is inserted into one end of the coil spring 40 to position the coil spring 40, preventing shifting and buckling of the coil spring 40 and thereby causing the coil spring 40 to press the temperature detecting element 31 against the heater 22 with a constant pressure.

The cushioning member 33 is interposed between the temperature detecting element 31 and the holding body 32, pressing the temperature detecting element 31 against the heater 22 precisely. For example, even if the first thermistor 25, the heater holder 23, and the like have dimensional tolerance in a vertical direction in FIG. 10, the cushioning member 33 is deformed elastically or compressed according to the dimensional tolerance, pressing the temperature detecting element 31 against the heater 22 precisely. In order to allow the cushioning member 33 to be deformed elastically or compressed, a gap S is provided between the heater holder 23 and the holding body 32 of the first thermistor 25.

The cushioning member 33 is made of a material that has a thermal conductivity and a rigidity that are smaller than a thermal conductivity and a rigidity of the holding body 32. The cushioning member 33 also has elasticity and thermal insulation. Thus, the cushioning member 33 also serves as a thermal insulator that decreases heat conducted from the heater 22 to the holding body 32.

A description is provided of a construction of a first thermistor 25C according to a comparative example that is different from the first thermistor 25 according to the embodiments of the present disclosure described above.

Figure 14:
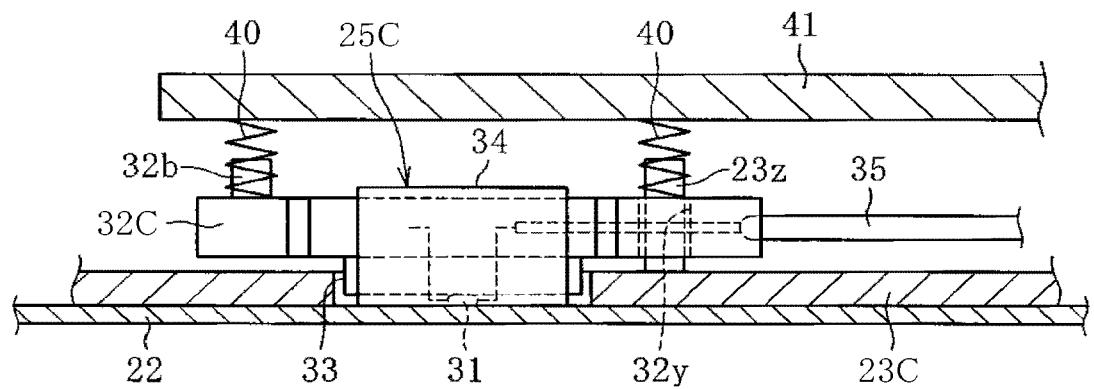
FIG. 14 is a side view of a thermistor according to a comparative example, illustrating a construction thereof for attachment.

FIG. 14 is a side view of the first thermistor 25C according to the comparative example, illustrating a construction thereof for attachment.

The first thermistor 25 according to the embodiments of the present disclosure described above includes the projecting engagement 32a to position the first thermistor 25 as illustrated in FIG. 10. Conversely, according to the comparative example depicted in FIG. 14, a heater holder 23C includes a projecting engagement 23z. Further, according to the comparative example, a holding body 32C of the first thermistor 25C includes a hole 32y that engages the projecting engagement 23z of the heater holder 23C. That is, the first thermistor 25 according to the embodiments of the present disclosure and the first thermistor 25C according to the comparative example have constructions for positioning the first thermistors 25 and 25C with respect to the heater holders 23 and 23C, respectively, in which a relation between a projection and a depression for the first thermistor 25 is opposite that for the first thermistor 25C. Other construction of the first thermistor 25C is basically equivalent to that of the first thermistor 25.

Figure 15:
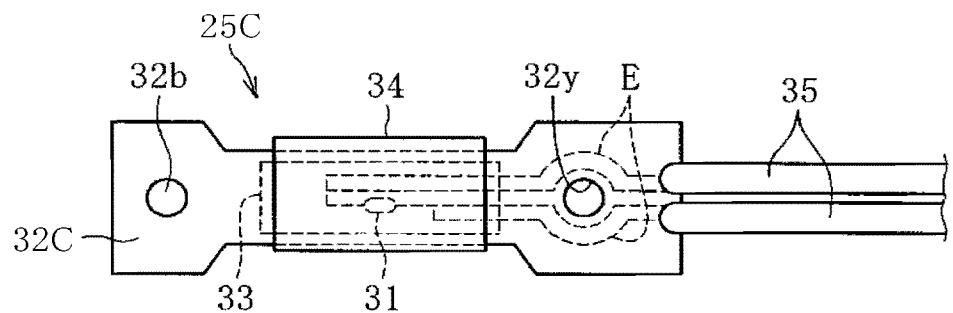
FIG. 15 is a plan view of the thermistor according to the comparative example depicted in FIG. 14.

If the hole 32y for positioning is situated in the holding body 32C of the first thermistor 25C according to the comparative example, the hole 32y may restrict a shape for routing and a position for attaching of the lead wires 35 situated inside the holding body 32C. For example, as illustrated in FIG. 15, if the hole 32y is situated in the holding body 32C, the lead wires 35 are requested to stay clear of the hole 32y. Accordingly, the lead wires 35 may be bent or curved at a part E in proximity to the hole 32y as illustrated in FIG. 15. Alternatively, the lead wires 35 may be partially narrowed with a curved recess. In those cases, the lead wires 35 may suffer from partial decrease in strength and degraded yield in manufacturing the lead wires 35, that results in increased manufacturing costs and the like. As a method for avoiding change in the shape for routing the lead wires 35, the lead wires 35 may be routed from one lateral end of the holding body 32C where the hole 32y is not disposed. However, in this case, the position for attaching the lead wires 35 is requested to be changed.

Conversely, in the first thermistor 25 according to the embodiments of the present disclosure described above, since the hole 32y for positioning is not disposed in the holding body 32, the shape for routing and the position for attaching of the lead wires 35 are not changed unlike in the first thermistor 25C according to the comparative example. Accordingly, in the first thermistor 25 according to the embodiments of the present disclosure, as illustrated in FIG. 7, the lead wires 35 are disposed linearly inside the holding body 32. Thus, in the first thermistor 25 according to the embodiments of the present disclosure, flexibility in the shape for routing and the position for attaching of the lead wires 35 improves. Accordingly, the shape of the lead wires 35 is not complicated, preventing increased manufacturing costs. The lead wires 35 are not narrowed partially, preventing a decreased strength. While the lead wires 35 retain durability, the lead wires 35 improve yield, reducing manufacturing costs.

The embodiments of the present disclosure are not limited to a configuration in which the lead wires 35 are disposed inside the holding body 32. For example, the lead wires 35 are not placed inside the holding body 32 and are placed along an exterior surface of the holding body 32, also attaining technical advantages. For example, even if the lead wires 35 are placed along an upper face of the holding body 32C depicted in FIG. 14, if the projecting engagement 23z projects from the hole 32y, the lead wires 35 are not placed over the hole 32y. Hence, the lead wires 35 are requested to be curved along an edge of the hole 32y or partially narrowed. Conversely, in the first thermistor 25 according to the embodiments of the present disclosure, since the holding body 32 is not provided with the hole 32y, the projecting engagement 23z does not project from the hole 32y. Accordingly, the lead wires 35 are disposed linearly inside the holding body 32, eliminating restriction of the shape for routing and the position for attaching of the lead wires 35.

Further, the first thermistor 25 according to the embodiments of the present disclosure attains similar advantages in arrangement of other elements in addition to the lead wires 35. For example, in the first thermistor 25 according to the embodiments of the present disclosure, the hole 32y is not disposed in the holding body 32, improving flexibility in a layout of elements disposed inside the holding body 32 or along the exterior surface of the holding body 32.

Additionally, the first thermistor 25 according to the embodiments of the present disclosure described above, compared to the first thermistor 25C according to the comparative example, attains advantages caused by structural differences described below in addition to improvement in flexibility in the layout of parts.

First, a description is provided of the structural differences.

In the first thermistor 25C according to the comparative example depicted in FIG. 14, the projecting engagement 23z that positions the first thermistor 25C also serves as a projection that positions the coil spring 40. Conversely, in the first thermistor 25 according to the embodiments of the present disclosure depicted in FIG. 10, the projecting engagement 32a that positions the first thermistor 25 is provided separately from the projection 32b that positions the coil spring 40. In the first thermistor 25C according to the comparative example, since the projecting engagement 23z also serves as the projection that positions the coil spring 40, the projecting engagement 23z is elongated. However, if the projecting engagement 23z is elongated, the projecting engagement 23z has an increased thickness to some extent to prevent deformation. Conversely, in the first thermistor 25 according to the embodiments of the present disclosure, the projecting engagement 32a is not elongated and therefore is not subject to deformation. Hence, the projecting engagement 32a has a decreased thickness. As described above, according to the embodiments of the present disclosure, the projecting engagement 32a is thin, decreasing a space occupied by the projecting engagement 32a and downsizing the holding body 32.

Like the embodiments of the present disclosure, in a configuration in which the first thermistor 25, the second thermistor 26, and the third thermistor 27 are disposed inside the loop formed by the fixing belt 20 as illustrated in FIG. 2, if the fixing belt 20 has a decreased diameter to downsize the fixing device 9, a space where the first thermistor 25, the second thermistor 26, and the third thermistor 27 are located decreases. Accordingly, in this configuration, downsizing of the first thermistor 25, the second thermistor 26, and the third thermistor 27 is an important subject to downsize the fixing device 9 and improve the layout of parts. However, if a thermistor is disposed opposite or pressed against a heater via an insulating sheet like the embodiments of the present disclosure, a creepage distance F for insulation depicted in FIG. 10 is ensured to a certain degree. The creepage distance F is from a conductor coupled to the temperature detecting element 31 to an end of the insulating sheet 34. Hence, downsizing of the fixing device 9 by narrowing the width of the insulating sheet 34 is limited. To address this circumstance, according to the embodiments of the present disclosure, the projecting engagement 32a is shortened compared to the projecting engagement 32y according to the comparative example. For example, the projecting engagement 32a is shorter than a thickness of the holding body 32. Accordingly, the projecting engagement 32a is thin, decreasing the space occupied by the projecting engagement 32a and downsizing the first thermistor 25.

According to the embodiment depicted in FIG. 6, a longitudinal direction of each of the first thermistor 25, the second thermistor 26, and the third thermistor 27 is parallel to the longitudinal direction of the heater 22. That is, the longitudinal direction of each of the first thermistor 25, the second thermistor 26, the third thermistor 27, and the heater 22 is directed in an identical direction. In this case, if each of the first thermistor 25, the second thermistor 26, and the third thermistor 27 is elongated, the first thermistor 25, the second thermistor 26, and the third thermistor 27 are not installed easily. For example, as illustrated in FIG. 6, when a plurality of thermistors, that is, the first thermistor 25 and the third thermistor 27, is disposed opposite a single heat generating portion, that is, the center heat generating portion 60A, the first thermistor 25 and the third thermistor 27 are not installed easily. To address this circumstance, according to the embodiments of the present disclosure described above, the space occupied by the projecting engagement 32a is decreased, downsizing the holding body 32 in the longitudinal direction thereof. Accordingly, even if the plurality of thermistors is disposed close to each other, the thermistors are installed readily without interfering with each other.

The longitudinal direction of the thermistor serving as a temperature detector according to the embodiments of the present disclosure, that is, the first thermistor 25, the second thermistor 26, and the third thermistor 27, is not limited to a direction defined by the longitudinal direction of the holding body 32. The longitudinal direction of the thermistor is defined by an outline shape of an entirety of the thermistor including elements that construct the thermistor, such as the temperature detecting element 31 and the insulating sheet 34 in addition to the holding body 32. However, elements that are oriented flexibly, such as the lead wires 35, are not considered as a factor that defines the longitudinal direction of the thermistor.

As illustrated in FIG. 8, according to the embodiments of the present disclosure described above, the projecting engagement 32a does not project in the longitudinal direction of the first thermistor 25, preventing the first thermistor 25 from being enlarged in the longitudinal direction thereof. The projecting engagement 32a projects downward in FIG. 8 in a direction perpendicular to the longitudinal direction of the first thermistor 25. A direction perpendicular to a face of the holding body 32 of the first thermistor 25, which mounts the temperature detecting element 31, that is, a vertical direction in FIG. 8, denotes a thickness direction. A direction perpendicular to both the thickness direction and the longitudinal direction of the first thermistor 25, that is, a direction perpendicular to a plane of paper in FIG. 8, denotes a width direction. According to the embodiments, the projecting engagement 32a projects in the thickness direction.

Figure 16:
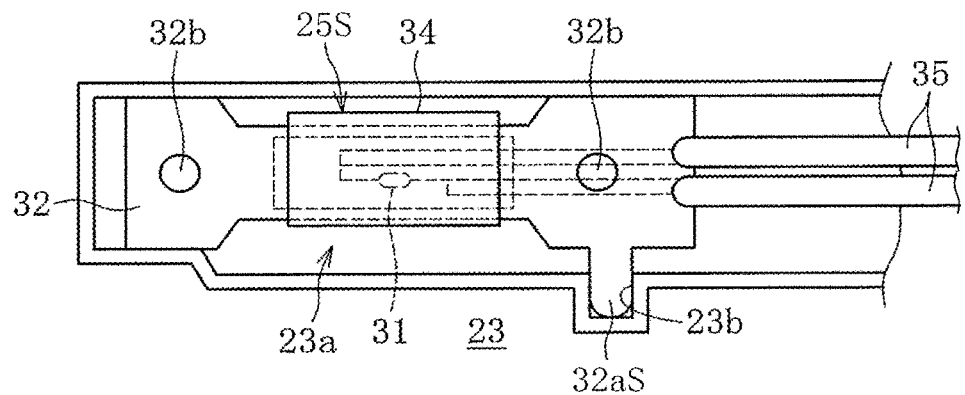
FIG. 16 is a diagram of a projecting engagement as a first variation of a projecting engagement of the thermistor depicted in FIG. 10, illustrating an example of the projecting engagement that projects in a width direction of the thermistor.
Figure 17:
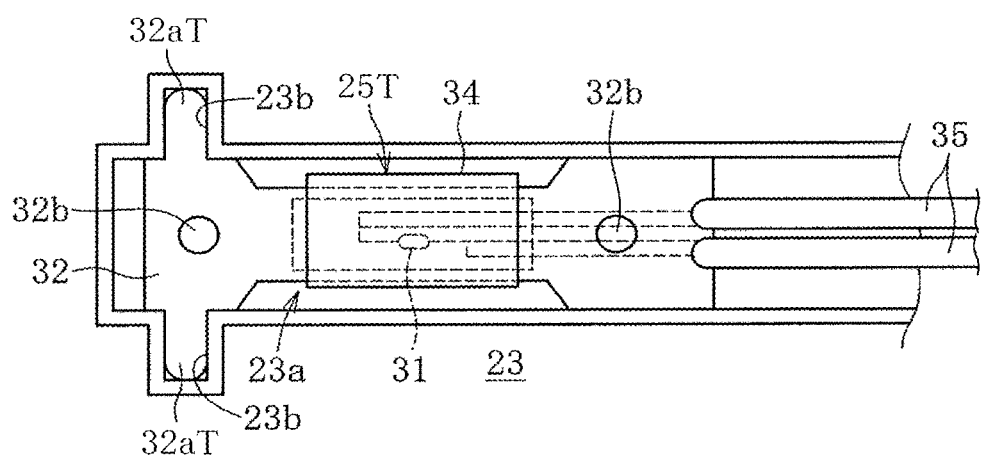
FIG. 17 is a diagram of projecting engagements as a second variation of the projecting engagement of the thermistor depicted in FIG. 10, illustrating another example of the projecting engagement that projects in the width direction of the thermistor.

FIG. 16 illustrates a first thermistor 25S incorporating a projecting engagement 32aS. FIG. 17 illustrates a first thermistor 25T incorporating projecting engagements 32aT. In order to prevent the first thermistor 25 from being upsized in the longitudinal direction thereof, as illustrated in examples in FIGS. 16 and 17, the projecting engagements 32aS and 32aT may project in a width direction of the first thermistors 25S and 25T. As illustrated in FIG. 16, the first thermistor 25S incorporates the single projecting engagement 32aS. As illustrated in FIG. 17, the first thermistor 25T incorporates the two projecting engagements 32aT. Alternatively, the number of the projecting engagements 32aS and 32aT may be three or more.

Figure 18:
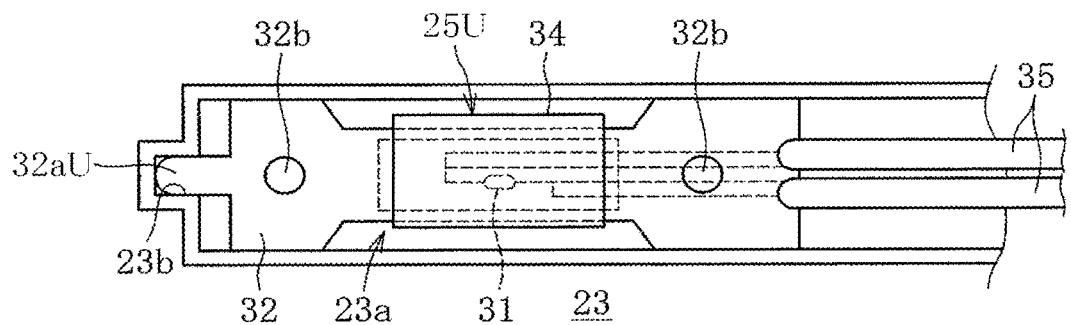
FIG. 18 is a diagram of a projecting engagement as a third variation of the projecting engagement of the thermistor depicted in FIG. 10, illustrating an example of the projecting engagement that projects in a longitudinal direction of the thermistor.

FIG. 18 illustrates a first thermistor 25U incorporating a projecting engagement 32aU. In order to prevent the first thermistor 25 from being upsized in the thickness direction and the width direction rather than the longitudinal direction thereof, as illustrated in an example in FIG. 18, the projecting engagement 32aU may project in a longitudinal direction of the first thermistor 25U.

According to the embodiments of the present disclosure, the projecting engagement 32a that positions the first thermistor 25 is not disposed in the heater holder 23 but in the first thermistor 25, also achieving advantages described below. In the first thermistor 25C according to the comparative example depicted in FIG. 14, the projecting engagement 23z is mounted on the heater holder 23C. In this case, as the temperature of the heater holder 23C increases while the heater 22 generates heat, the temperature of the projecting engagement 23z increases similarly and the projecting engagement 23z is subject to high temperatures. Conversely, according to the embodiments of the present disclosure, as illustrated in FIG. 10, the cushioning member 33 serving as a thermal insulator is interposed between the heater 22 and the holding body 32. Accordingly, heat generated by the heater 22 is not conducted easily to the projecting engagement 32a mounted on the holding body 32. Hence, according to the embodiments of the present disclosure, the projecting engagement 32a is not heated to high temperatures easily and therefore barely suffers from thermal degradation and deformation. Additionally, in order to achieve such advantages properly, at least a part of the projecting engagement 32a is preferably disposed such that the projecting engagement 32a does not contact the heater 22 and the hole 23b of the heater holder 23.

Figure 19:
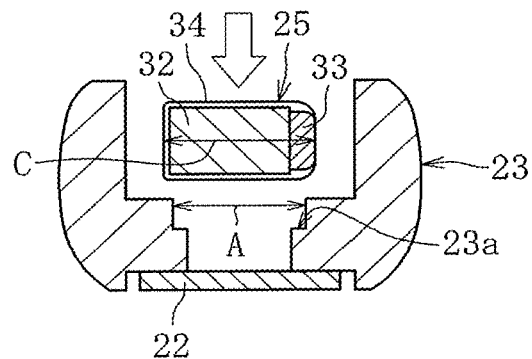
FIG. 19 is a cross-sectional view of the thermistor depicted in FIG. 10, which is erroneously installed.

As described above, according to the embodiments of the present disclosure, the projecting engagement 32a is not disposed in the heater holder 23 but in the first thermistor 25, achieving advantages of improving flexibility in the layout of parts, suppressing temperature increase of the projecting engagement 32a, and the like. However, since the heater holder 23 is not provided with a projecting engagement, the first thermistor 25 may be subject to erroneous assembly. To address this circumstance, according to the embodiments of the present disclosure, as illustrated in FIG. 12, dimensions A, B, and C in a cross section that is perpendicular to the longitudinal direction of the first thermistor 25 satisfy a relation of B<A<C. The dimension A defines a dimension in the width direction of an insertion portion (e.g., the accommodating portion 23a) of the heater holder 23 into which the first thermistor 25 is inserted. The dimension B defines a dimension in the width direction of an inserted portion 25i of the first thermistor 25, which is inserted into the accommodating portion 23a. The dimension C defines a dimension of an entirety of the first thermistor 25 in the thickness direction perpendicular to the width direction. Since the dimensions A, B, and C define the relation of B<A<C, as illustrated in FIG. 19, even if the first thermistor 25 is about to be installed erroneously by confusing the thickness direction with the width direction, for example, by shifting a phase by 90 degrees, the dimension C of the entirety of the first thermistor 25 in the thickness direction is greater than the dimension A of the accommodating portion 23a in the width direction, thus preventing the first thermistor 25 from being placed in the accommodating portion 23a erroneously.

Figure 20:
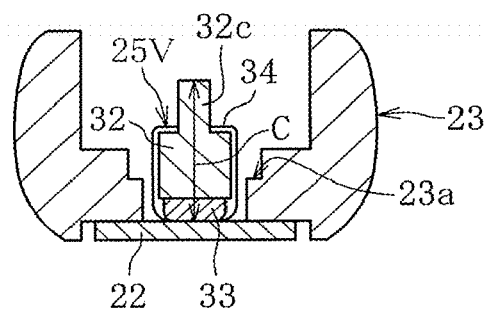
FIG. 20 is a cross-sectional view of a thermistor as a variation of the thermistor depicted in FIG. 10, illustrating an example of a holding body mounting a projection to attain a dimension in a thickness direction.

The relation of B<A<C satisfied by the dimensions A, B, and C is not limited to a relation in the cross section of the first thermistor 25 illustrated in FIG. 12. The relation of B<A<C may be established in any of arbitrary cross sections perpendicular to the longitudinal direction of the first thermistor 25. FIG. 20 illustrates a first thermistor 25V incorporating a projection 32c. In order to enlarge the dimension C of an entirety of the first thermistor 25V in the thickness direction, as illustrated in an example in FIG. 20, the holding body 32 may mount the projection 32c that projects in the thickness direction. The projection 32c reduces manufacturing costs compared to the example depicted in FIG. 12 in which the holding body 32 overall has an increased thickness.

As illustrated in FIG. 8, according to the embodiments of the present disclosure, the projecting engagement 32a is disposed on one lateral end of the holding body 32 (e.g., a right end in FIG. 8), from which the lead wires 35 extend in an extending direction thereof. Hence, when an operator installs the first thermistor 25 by catching an exposed portion of the lead wires 35, the operator performs installation readily. For example, since the projecting engagement 32a is situated at a position close to a position where the operator catches the lead wires 35, the projecting engagement 32a helps the operator align and insert the projecting engagement 32a into the hole 23b, facilitating installation of the first thermistor 25. Alternatively, contrarily to the embodiments of the present disclosure, the projecting engagement 32a may be disposed on another lateral end of the holding body 32 (e.g., a left end in FIG. 8) where the lead wires 35 are not exposed depending on the shape of the counterpart to which the first thermistor 25 is attached, a layout of peripheral elements of the first thermistor 25, and the like.

Figure 21:
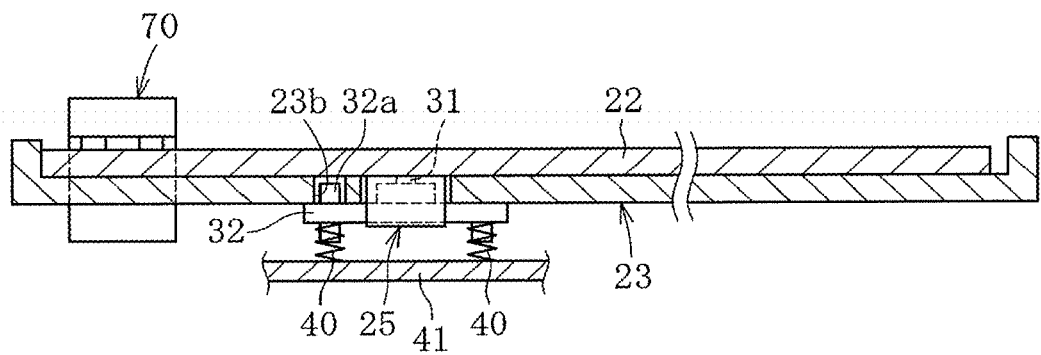
FIG. 21 is a diagram of the thermistor depicted in FIG. 10, illustrating an example of the thermistor disposed in proximity to the connector.

The embodiments of the present disclosure are also applicable to a configuration in which the connector 70 is attached to one lateral end of the heater 22 and the heater holder 23 in the longitudinal direction thereof as illustrated in FIG. 21. In this case, when the heater 22 generates heat and expands thermally in the longitudinal direction thereof, the heater 22 may shift substantially at one lateral end in the longitudinal direction thereof, that is opposite another lateral end where the connector 70 sandwiches the heater 22. To address this circumstance, as illustrated in FIG. 21, the first thermistor 25 is preferably disposed at another lateral end of the heater 22 where the connector 70 sandwiches the heater 22, so that the first thermistor 25 is not affected by shifting of the heater 22. Additionally, in order to cause the first thermistor 25 to be less affected by shifting of the heater 22, the projecting engagement 32a for positioning the first thermistor 25 is preferably disposed closer to the connector 70 than the temperature detecting element 31 is. Accordingly, even if the heater 22 thermally expands, the projecting engagement 32a decreases change in the position where the first thermistor 25 contacts the heater 22, preventing degradation in the accuracy of temperature detection caused by shifting of the heater 22.

Figure 22:
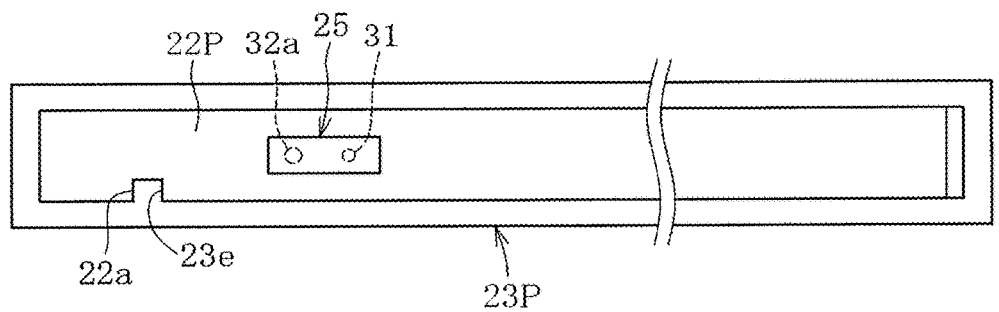
FIG. 22 is a diagram of the thermistor depicted in FIG. 10, illustrating an example of the thermistor disposed in proximity to a positioner of the heater.

FIG. 22 illustrates a heater 22P incorporating a positioner 22a and a heater holder 23P incorporating a positioner 23e. As illustrated in an example in FIG. 22, the positioner 22a as a depression and the positioner 23e as a projection position the heater 22P and the heater holder 23P in a longitudinal direction thereof. If the positioners 22a and 23e are disposed at one lateral end of the heater 22P and the heater holder 23P, respectively, in the longitudinal direction thereof, the first thermistor 25 is preferably disposed opposite the one lateral end where the positioners 22a and 23e are disposed. It is because, similarly to the above, the projecting engagement 32a of the first thermistor 25 decreases change in the position where the first thermistor 25 contacts the heater 22P, that may occur as the heater 22P thermally expands. Additionally, similarly to the above, in order to cause the first thermistor 25 to be less affected by shifting of the heater 22P, the projecting engagement 32a for positioning the first thermistor 25 is preferably disposed closer to the positioners 22a and 23e than the temperature detecting element 31 is.

As described above, according to the embodiments of the present disclosure, since the hole 23b for positioning the first thermistor 25 is disposed in the heater holder 23, the hole 23b decreases a cross-sectional area of a hole defining portion of the heater holder 23 where the hole 23b is disposed. Accordingly, the hole defining portion of the heater holder 23 has a decreased thermal capacity. Consequently, the hole defining portion of the heater holder 23 decreases conduction of heat from the heater 22 to the heater holder 23, causing the temperature of the heater 22 to increase quickly.

Figure 23:
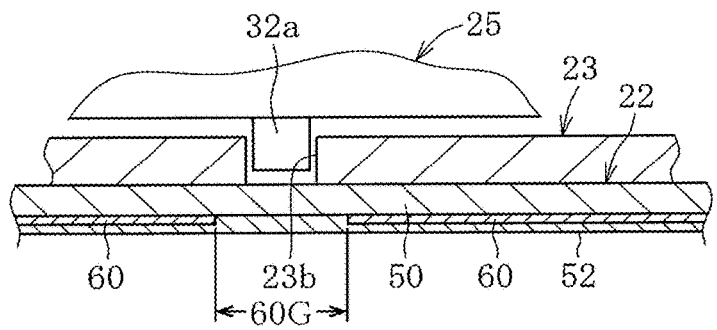
FIG. 23 is a diagram of the heater holder depicted in FIG. 5, illustrating an example of the heater holder incorporating a hole disposed opposite a gap between heat generating portions.

The projecting engagement 32a of the first thermistor 25 is inserted into the hole 23b. The projecting engagement 32a does not contact the heater 22, suppressing conduction of heat from the heater 22 to the first thermistor 25. Thus, since the hole defining portion of the heater holder 23 causes the temperature of the heater 22 to increase quickly, the hole 23b is preferably disposed opposite a gap 60G provided in the heat generator 60, that is, the gap 60G between the center heat generating portion 60A and the lateral end heat generating portion 60B, as illustrated in FIG. 23 because the heat generator 60 generates a decreased amount of heat at the gap 60G. As described above, the hole defining portion of the heater holder 23, that is subject to temperature increase, is disposed opposite the gap 60G between the center heat generating portion 60A and the lateral end heat generating portion 60B, that is subject to temperature decrease, thus reducing temperature decrease at the gap 60G and suppressing uneven temperature of the fixing belt 20 in the axial direction thereof.

According to the embodiment of the present disclosure depicted in FIG. 10, the hole 23b is a through hole penetrating through the heater holder 23 in the thickness direction. Alternatively, the hole 23b may be a recess having a bottom face. In this case also, the hole 23b produces the hole defining portion of the heater holder 23, that has a decreased thermal capacity. The hole defining portion of the heater holder 23 reduces absorption of heat by the heater holder 23, facilitating temperature increase of the heater 22.

Figure 24:
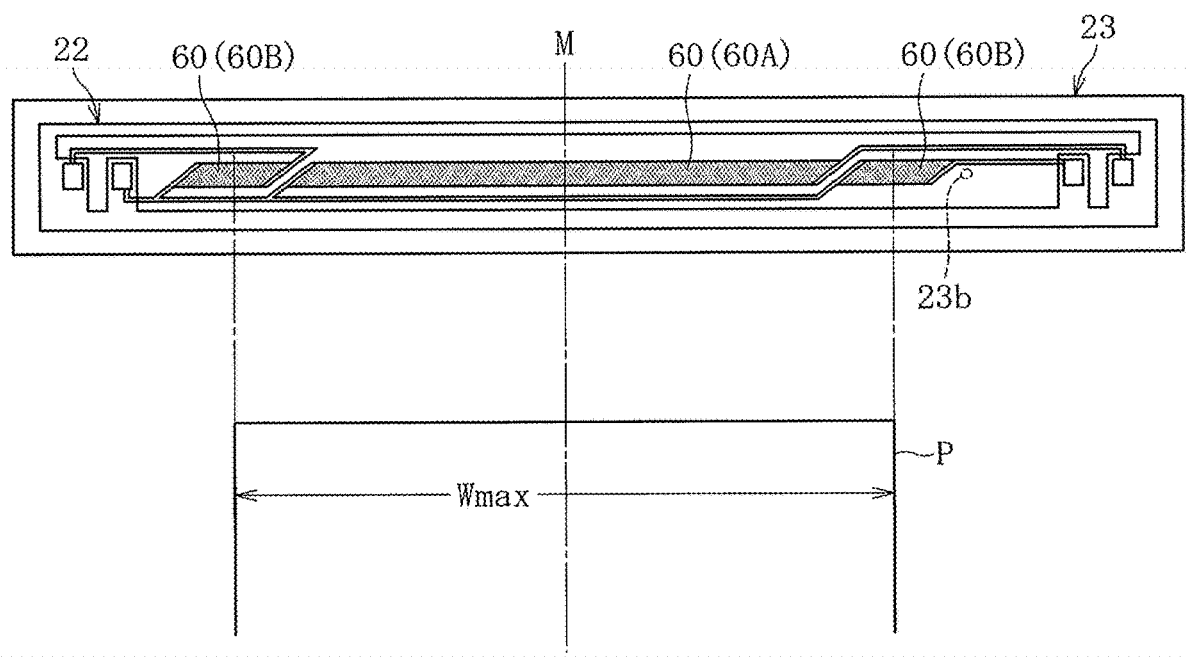
FIG. 24 is a diagram of the heater holder depicted in FIG. 5, illustrating an example of the hole of the heater holder, that is disposed outboard from a conveyance span where a sheet having a maximum width is conveyed.

Conversely, if the hole 23b is disposed opposite the center heat generating portion 60A or the lateral end heat generating portion 60B, not between the gap 60G therebetween, the temperature of the heater 22 may increase partially at an opposed portion of the heater 22, that is disposed opposite the hole 23b, causing uneven temperature of the heater 22. However, in view of quality of the toner image fixed on the sheet P, temperature increase of the opposed portion of the heater 22 is not disadvantageous, if the opposed portion of the heater 22 is disposed outboard at least from a fixing region on the sheet P where the toner image is fixed on the sheet P. Accordingly, as illustrated in an example in FIG. 24, the hole 23b is disposed outboard from a conveyance span in the axial direction of the fixing belt 20 where a sheet P having a maximum width Wmax is conveyed. The maximum width Wmax is a maximum width of a sheet P among a plurality of widths of sheets P that are available in the image forming apparatus 100. Accordingly, even if the temperature of the heater 22 increases partially in the opposed portion of the heater 22, that is disposed opposite the hole 23b, temperature increase of the heater 22 less affects quality of the toner image fixed on the sheet P. Thus, degradation in quality of the toner image fixed on the sheet P is prevented.

Figure 25:
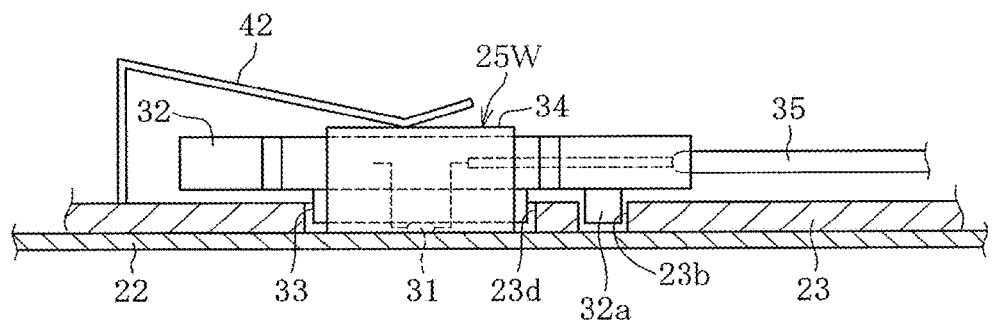
FIG. 25 is a diagram of a thermistor as another variation of the thermistor depicted in FIG. 10, illustrating a flat spring anchored to the thermistor.

FIG. 25 illustrates a first thermistor 25W incorporating a flat spring 42. As illustrated in an example in FIG. 25, the embodiments of the present disclosure are also applicable to the first thermistor 25W employing the flat spring 42. In the first thermistor 25W, the flat spring 42 is anchored to the heater holder 23. The flat spring 42 biases the holding body 32 of the first thermistor 25W against the heater 22 and the heater holder 23. However, arrangement of the flat spring 42 is not limited to the example illustrated in FIG. 25. For example, like the embodiment of the present disclosure described above, that employs the coil spring 40, a biasing member that biases the first thermistor 25W (e.g., the coil spring 40 and the flat spring 42) does not project beyond the holding body 32 in the longitudinal direction thereof, thus downsizing the first thermistor 25W in a longitudinal direction thereof.

Figure 26:
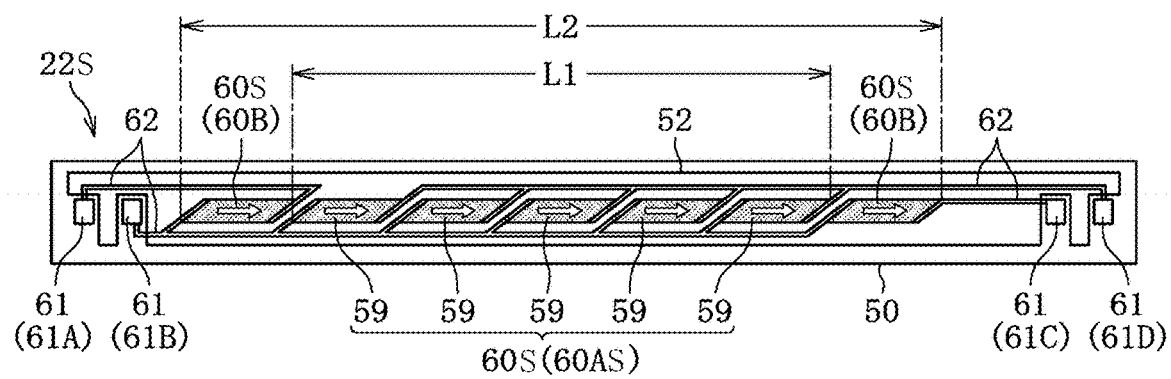
FIG. 26 is a plan view of a heater as a first variation of the heater depicted in FIG. 3.
Figure 27:
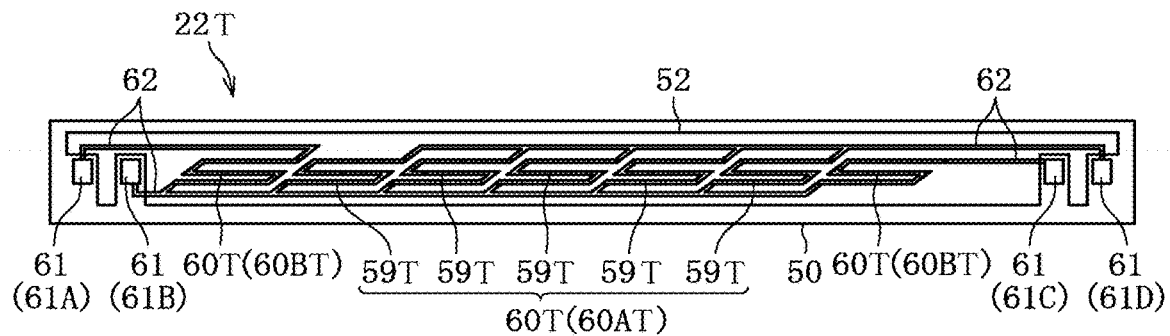
FIG. 27 is a plan view of a heater as a second variation of the heater depicted in FIG. 3.
Figure 28:
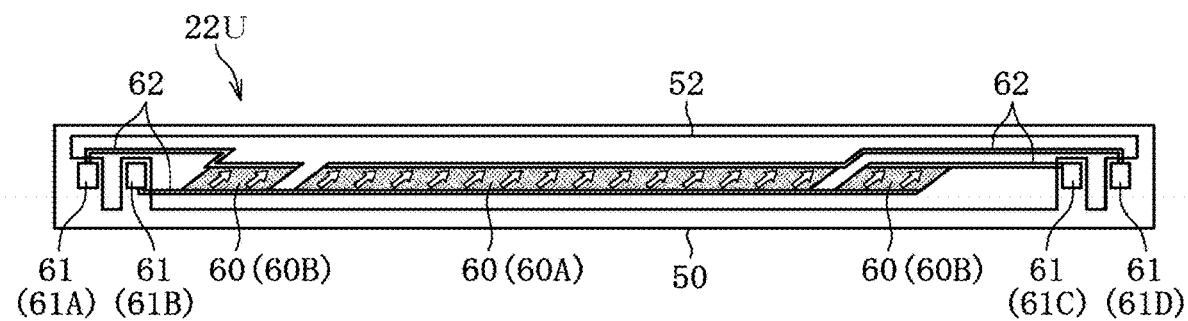
FIG. 28 is a plan view of a heater as a third variation of the heater depicted in FIG. 3.

Alternatively, the heater 22 according to the embodiments of the present disclosure may have constructions illustrated in FIGS. 26 to 28, respectively, other than the construction described above.

FIG. 26 illustrates a heater 22S as a first variation of the heater 22. The heater 22S includes a heat generator 60S incorporating a center heat generating portion 60AS which is divided into a plurality of heat generating blocks 59 in a longitudinal direction of the center heat generating portion 60AS. The center heat generating portion 60AS is not constructed of a single elongate heat generating block and is divided into the plurality of short heat generating blocks 59. Accordingly, a width of each of the heat generating blocks 59 is equivalent to a width of each of the lateral end heat generating portions 60B in a longitudinal direction of the heater 22S. A resistance value of each of the heat generating blocks 59 is equivalent to a resistance value of each of the lateral end heat generating portions 60B. For example, a width span L1 of the center heat generating portion 60AS is equivalent to a width of 215 mm of an A4 size sheet in portrait orientation. A width span L2 of a heat generating span defines a combined width of a width of one lateral end heat generating portion 60B, a width of the center heat generating portion 60AS, and a width of another lateral end heat generating portion 60B in the longitudinal direction of the heater 22S. The width span L2 is equivalent to a width of 301 mm of an A3 size sheet in portrait orientation. In this case, as the center heat generating portion 60AS is divided into the five heat generating blocks 59, each of the heat generating blocks 59 and the lateral end heat generating portions 60B has an identical width of 43 mm. Accordingly, the resistance value of each of the heat generating blocks 59 is equivalent to the resistance value of each of the lateral end heat generating portions 60B, thus heating the fixing belt 20 evenly in the width direction thereof.

FIG. 27 illustrates a heater 22T as a second variation of the heater 22. The heater 22T includes a heat generator 60T incorporating a center heat generating portion 60AT and lateral end heat generating portions 60BT. The center heat generating portion 60AT is divided into a plurality of heat generating blocks 59T in a longitudinal direction of the center heat generating portion 60AT. Each of the heat generating blocks 59T and the lateral end heat generating portions 60BT is bent to produce a turned pattern. An electric current flows along the turned pattern.

FIG. 28 illustrates a heater 22U as a third variation of the heater 22. Each of the center heat generating portion 60A and the lateral end heat generating portions 60B is coupled to the feeders 62 at each end of the center heat generating portion 60A and the lateral end heat generating portions 60B in a short direction thereof. In this case, as illustrated with arrows in FIG. 28, the electric current flows in diagonal directions defined by the longitudinal directions and the short directions of the center heat generating portion 60A and the lateral end heat generating portions 60B, respectively.

A gap between adjacent heat generating portions (e.g., the center heat generating portions 60A, 60AS, and 60AT and the lateral end heat generating portions 60B and 60BT) or a gap between adjacent heat generating blocks (e.g., the heat generating blocks 59 and 59T) is preferably 0.2 mm or greater, more preferably 0.4 mm or greater, in view of ensuring insulation therebetween. If the gap is excessively great, the gap is subject to temperature decrease. To address this circumstance, the gap is preferably 5 mm or smaller, more preferably 1 mm or smaller, in view of suppressing uneven temperature of the heaters 22, 22S, 22T, and 22U in a longitudinal direction thereof.

Figure 29:
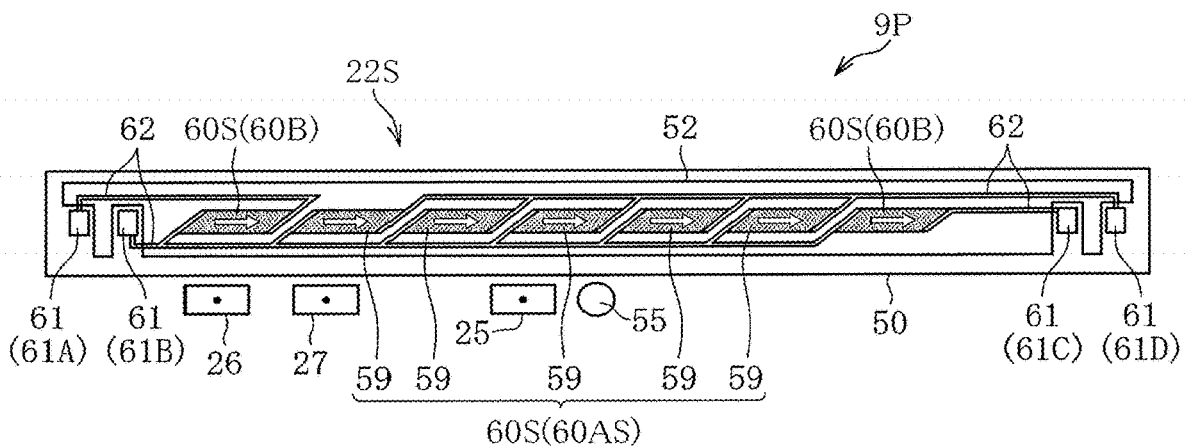
FIG. 29 is a diagram of a fixing device installable in the image forming apparatus depicted in FIG. 1, illustrating a thermostat incorporated in the fixing device.

FIG. 29 illustrates a fixing device 9P incorporating a thermostat 55. As illustrated in an example in FIG. 29, the fixing device 9P includes the thermostat 55 in addition to the first thermistor 25, the second thermistor 26, and the third thermistor 27. The thermostat 55 serves as a power interrupter that interrupts power supply to the heat generator 60S. When the thermostat 55 detects that a temperature of the heat generator 60S is a predetermined temperature or higher, the thermostat 55 interrupts power supply to the heat generator 60S. As illustrated in FIG. 29, the center heat generating portion 60AS is constructed of the plurality of heat generating blocks 59 connected in parallel. Hence, the thermostat 55 disposed opposite the center heat generating portion 60AS is preferably disposed opposite the identical heat generating block 59 disposed opposite the first thermistor 25. Since the thermostat 55 and the first thermistor 25 are disposed opposite the identical heat generating block 59, even if the identical heat generating block 59 suffers from disconnection and the thermostat 55 does not detect overheating, the first thermistor 25 detects abnormal temperature decrease caused by disconnection, identifying failure of the heater 22S. Alternatively, a fuse may be used as a power interrupter, instead of the thermostat 55.

According to the embodiments described above, a heater (e.g., the heaters 22, 22P, 22S, 22T, and 22U) includes a plurality of heat generating portions (e.g., the center heat generating portions 60A, 60AS, and 60AT and the lateral end heat generating portions 60B and 60BT) that is controlled separately from each other as examples. Alternatively, the embodiments of the present disclosure are also applicable to a heater that incorporates a single heat generating portion, instead of the heater that incorporates the plurality of heat generating portions. According to the embodiments described above, a first thermistor (e.g., the first thermistors 25, 25S, 25T, 25U, 25V, and 25W) is positioned with respect to a heater holder (e.g., the heater holders 23 and 23P) serving as a counterpart. Alternatively, the counterpart is not limited to the heater holder 23 or 23P and may be the stay 24 or other element. Further, the temperature detector according to the embodiments of the present disclosure is not limited to the first thermistor that detects the temperature of a heater (e.g., the heaters 22, 22S, 22T, and 22U). The embodiments of the present disclosure are also applicable to a temperature detector that detects the temperature of a detecting target other than the heater, such as the fixing belt 20.

The embodiments of the present disclosure are also applicable to fixing devices 9U, 9V, 9W, 9X, 9Y, and 9Z illustrated in FIGS. 30 to 35, respectively, other than the fixing devices 9 and 9P described above. The following briefly describes a construction of each of the fixing devices 9U, 9V, 9W, 9X, 9Y, and 9Z depicted in FIGS. 30 to 35, respectively.

A description is provided of the construction of the fixing device 9U.

Figure 30:
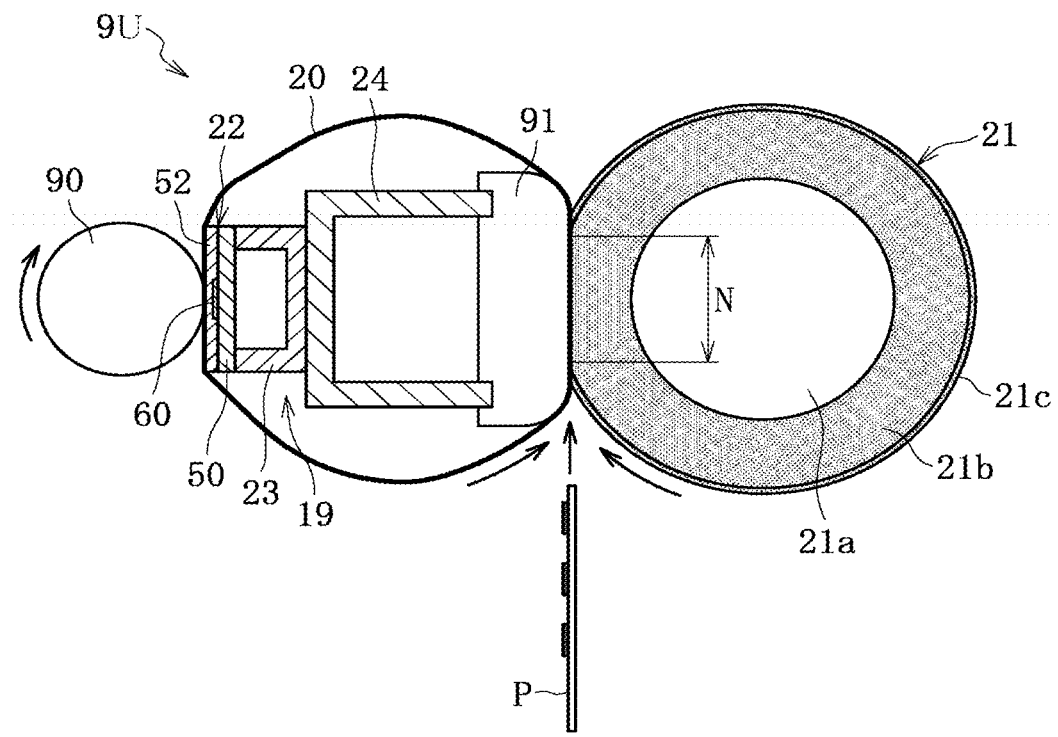
FIG. 30 is a schematic cross-sectional view of a fixing device installable in the image forming apparatus depicted in FIG. 1 as a first variation of the fixing device depicted in FIG. 2.

As illustrated in FIG. 30, the fixing device 9U includes a pressing roller 90 disposed opposite the pressure roller 21 via the fixing belt 20. The pressing roller 90 and the heater 22 sandwich the fixing belt 20 so that the heater 22 heats the fixing belt 20. On the other hand, a nip forming pad 91 is disposed inside the loop formed by the fixing belt 20 and disposed opposite the pressure roller 21. The stay 24 supports the nip forming pad 91. The nip forming pad 91 and the pressure roller 21 sandwich the fixing belt 20 and define the fixing nip N.

Figure 31:
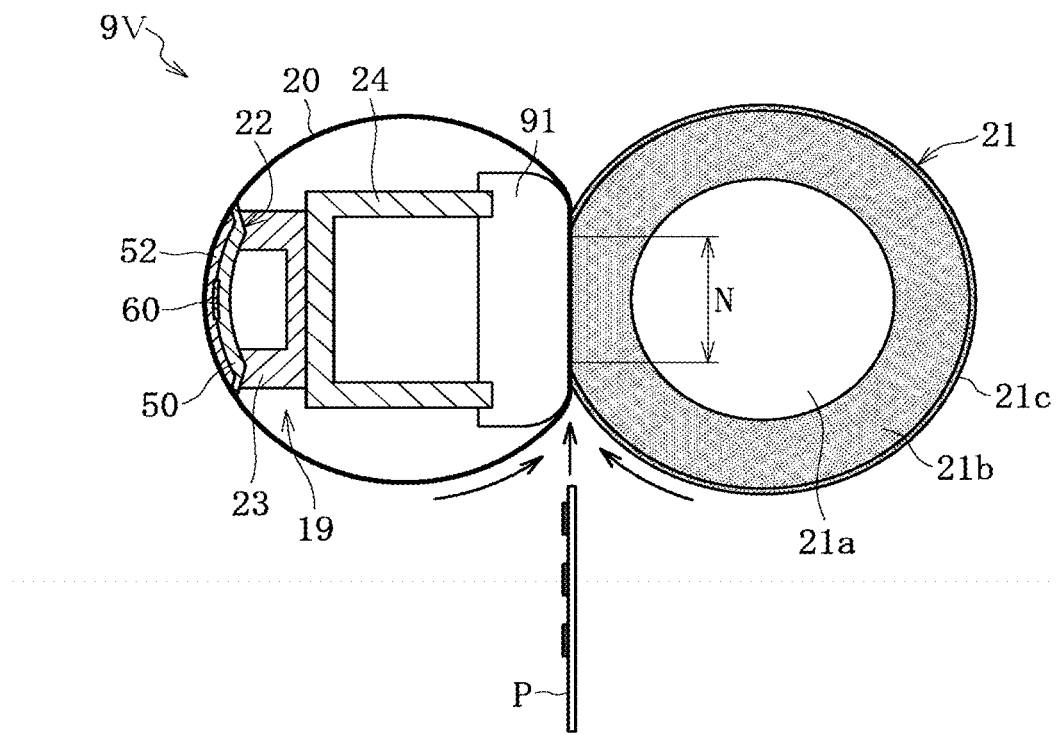
FIG. 31 is a schematic cross-sectional view of a fixing device installable in the image forming apparatus depicted in FIG. 1 as a second variation of the fixing device depicted in FIG. 2.

A description is provided of the construction of the fixing device 9V depicted in FIG. 31.

As illustrated in FIG. 31, the fixing device 9V does not include the pressing roller 90 described above with reference to FIG. 30. In order to attain a contact length for which the heater 22 contacts the fixing belt 20 in a circumferential direction thereof, the heater 22 is curved into an arc in cross section that corresponds to a curvature of the fixing belt 20. Other construction of the fixing device 9V is equivalent to that of the fixing device 9U depicted in FIG. 30.

Figure 32:
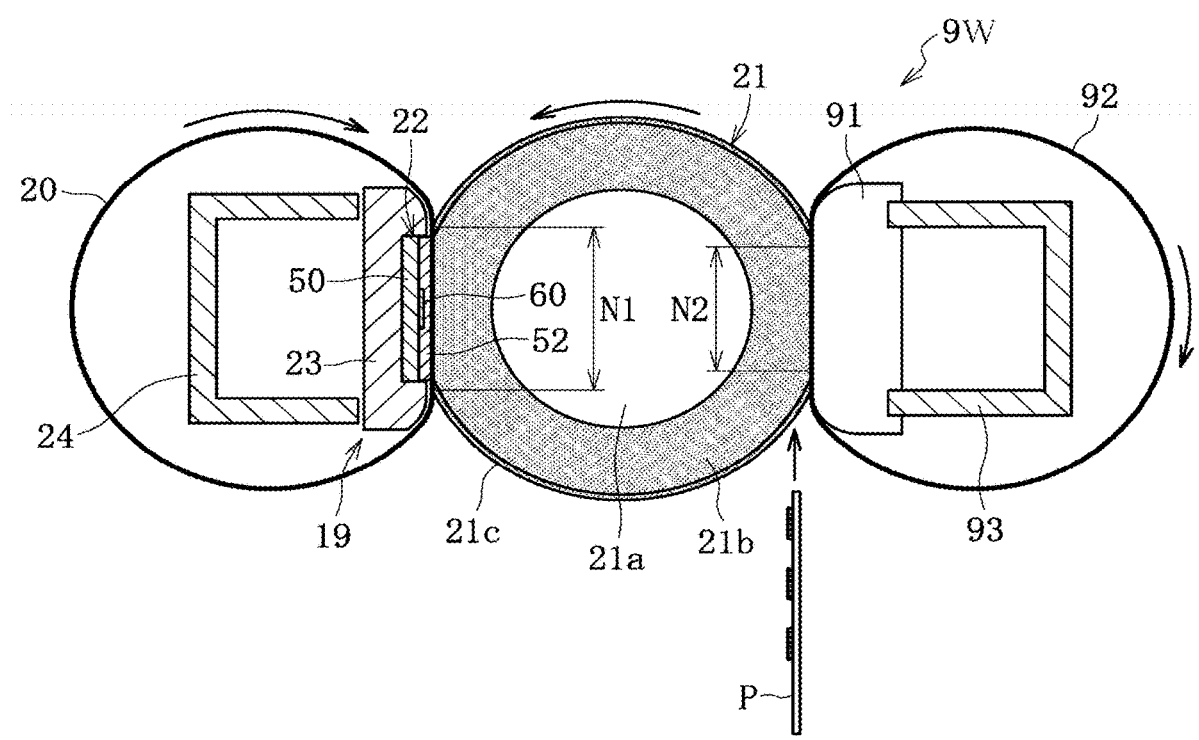
FIG. 32 is a schematic cross-sectional view of a fixing device installable in the image forming apparatus depicted in FIG. 1 as a third variation of the fixing device depicted in FIG. 2.

A description is provided of the construction of the fixing device 9W depicted in FIG. 32.

As illustrated in FIG. 32, the fixing device 9W includes a pressure belt 92 in addition to the fixing belt 20. The pressure belt 92 and the pressure roller 21 form a fixing nip N2 serving as a secondary nip separately from a heating nip N1 serving as a primary nip formed between the fixing belt 20 and the pressure roller 21. For example, the nip forming pad 91 and a stay 93 are disposed opposite the fixing belt 20 via the pressure roller 21. The pressure belt 92 that is rotatable accommodates the nip forming pad 91 and the stay 93. As a sheet P bearing a toner image is conveyed through the fixing nip N2 formed between the pressure belt 92 and the pressure roller 21, the pressure belt 92 and the pressure roller 21 fix the toner image on the sheet P under heat and pressure. Other construction of the fixing device 9W is equivalent to that of the fixing device 9 depicted in FIG. 2.

Figure 33:
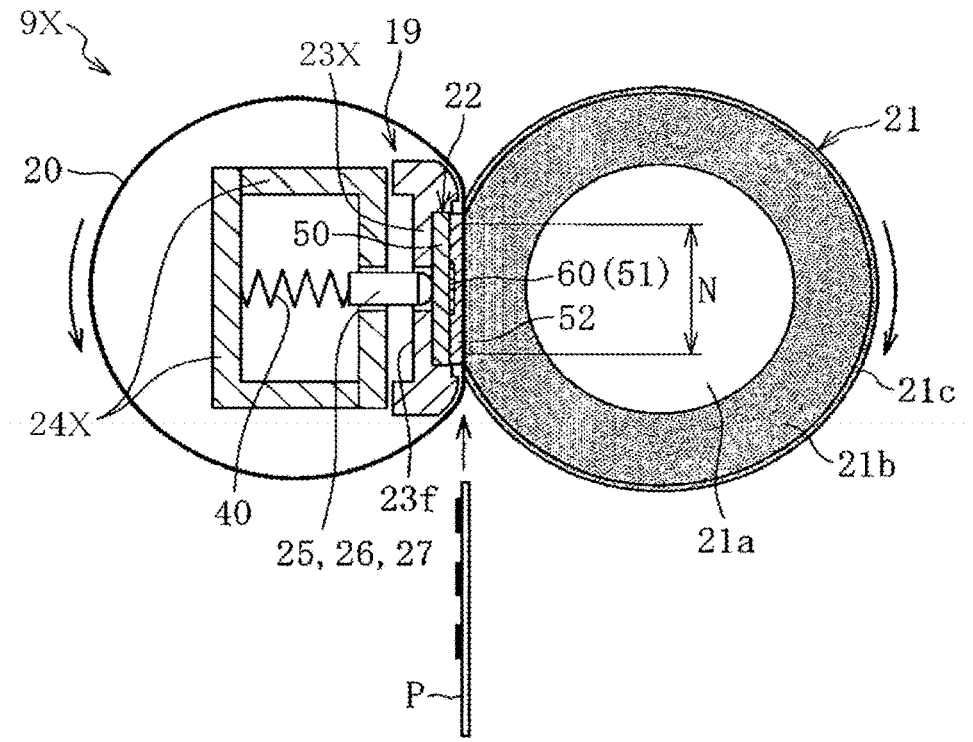
FIG. 33 is a schematic cross-sectional view of a fixing device installable in the image forming apparatus depicted in FIG. 1 as a fourth variation of the fixing device depicted in FIG. 2.

A description is provided of the construction of the fixing device 9X depicted in FIG. 33.

As illustrated in FIG. 33, the fixing device 9X includes a stay 24X constructed of two L-shaped portions in cross section that are joined by caulking, welding, screwing, or the like. A recess 23f is disposed on a stay side face of a heater holder 23X, that faces the stay 24X. The recess 23f causes the heater holder 23X to be separated from the stay 24X at a portion of the heater holder 23X, that is provided with the recess 23f. Accordingly, the recess 23f decreases conduction of heat from the heater holder 23X to the stay 24X. Other construction of the fixing device 9X is equivalent to that of the fixing device 9 depicted in FIG. 2.

Figure 34:
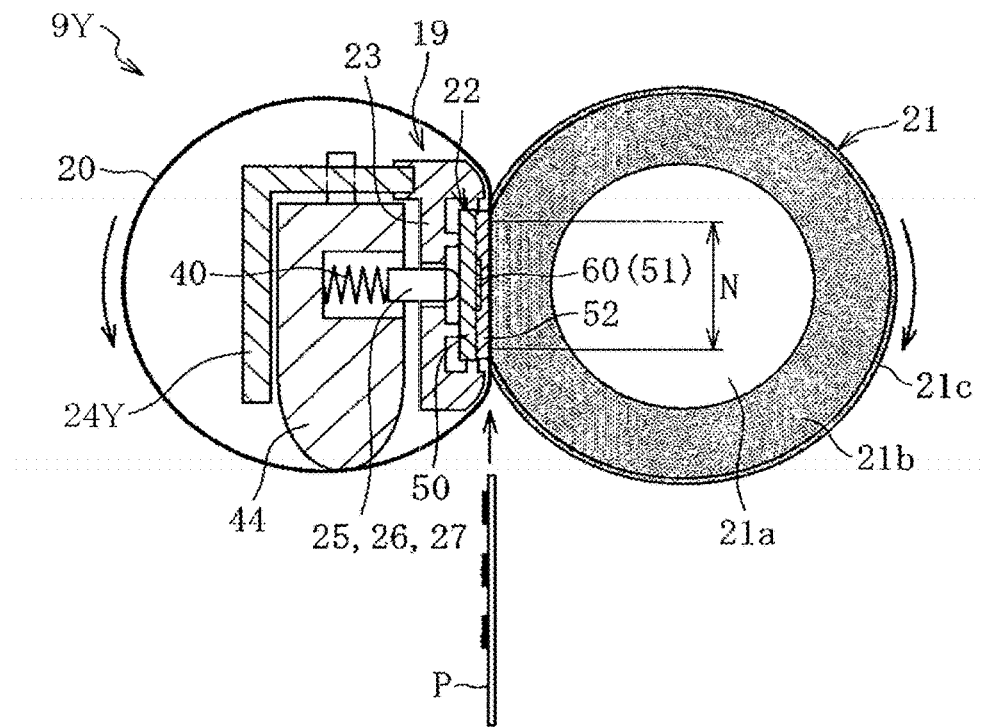
FIG. 34 is a schematic cross-sectional view of a fixing device installable in the image forming apparatus depicted in FIG. 1 as a fifth variation of the fixing device depicted in FIG. 2.

A description is provided of the construction of the fixing device 9Y depicted in FIG. 34.

As illustrated in FIG. 34, the fixing device 9Y includes a stay 24Y constructed of a single L-shaped portion in cross section that is cantilevered by the heater holder 23. The stay 24Y mounts a belt guide 44 that contacts the inner circumferential surface of the fixing belt 20 and guides the fixing belt 20. In an example depicted in FIG. 34, the belt guide 44 contacts the fixing belt 20 at an upstream position disposed upstream from the fixing nip N in a rotation direction of the fixing belt 20. The belt guide 44 also serves as a support that supports the coil spring 40. For example, the belt guide 44 is preferably made of a resin material that improves heat resistance, such as LCP. Other construction of the fixing device 9Y is equivalent to that of the fixing device 9 depicted in FIG. 2.

Figure 35:
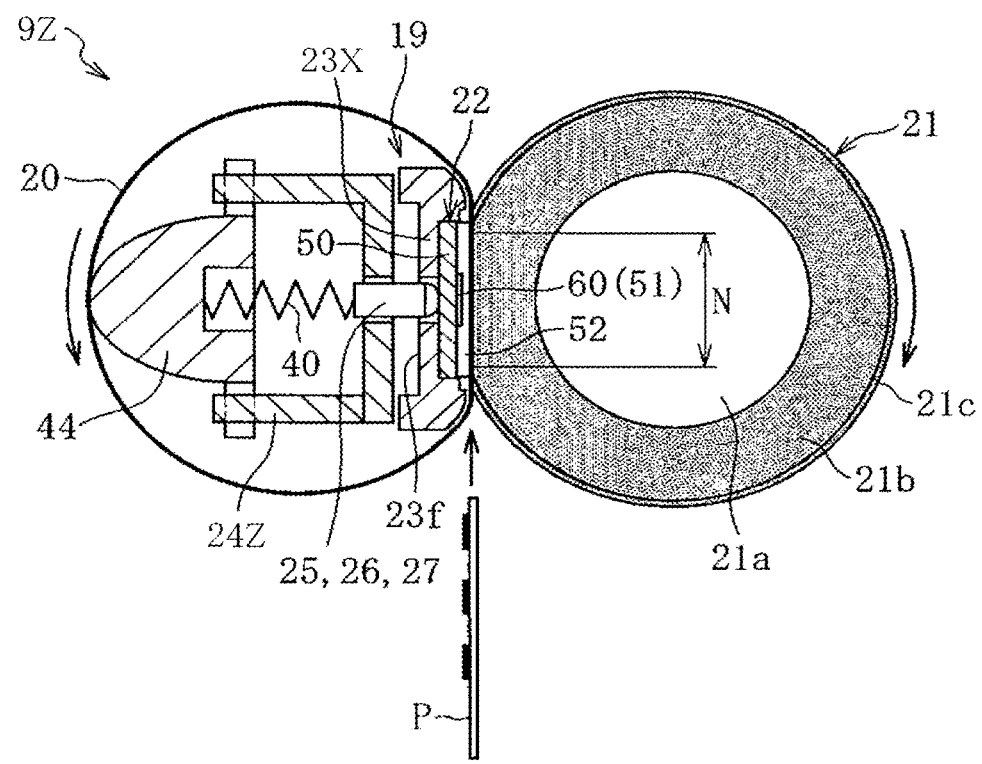
FIG. 35 is a schematic cross-sectional view of a fixing device installable in the image forming apparatus depicted in FIG. 1 as a sixth variation of the fixing device depicted in FIG. 2.

A description is provided of the construction of the fixing device 9Z depicted in FIG. 35.

As illustrated in FIG. 35, the fixing device 9Z includes a stay 24Z inverted horizontally in FIG. 35 from an orientation of the stay 24 depicted in FIG. 2. In the fixing device 9Z depicted in FIG. 35, the belt guide 44 contacts the fixing belt 20 at a position disposed opposite the fixing nip N via the stay 24Z, the heater holder 23X, and the heater 22. Like the belt guide 44 depicted in FIG. 34, the belt guide 44 depicted in FIG. 35 also serves as a support that supports the coil spring 40. Additionally, in the fixing device 9Z depicted in FIG. 35, like the fixing device 9X depicted in FIG. 33, the recess 23f is disposed on the stay side face of the heater holder 23X, that faces the stay 24Z. Accordingly, the recess 23f decreases conduction of heat from the heater holder 23X to the stay 24Z. Other construction of the fixing device 9Z is equivalent to that of the fixing device 9 depicted in FIG. 2.

The above describes the constructions of various fixing devices (e.g., the fixing devices 9, 9P, 9U, 9V, 9W, 9X, 9Y, and 9Z) to which the embodiments of the present disclosure are applicable. However, the heaters 22, 22P, 22S, 22T, and 22U according to the embodiments of the present disclosure are also applicable to devices other than the fixing devices. For example, the heaters 22, 22P, 22S, 22T, and 22U according to the embodiments of the present disclosure are also applicable to a dryer installed in an image forming apparatus employing an inkjet method. The dryer dries ink applied onto a sheet. The heating device 19 according to the embodiments of the present disclosure is not limited to a heating device that heats a sheet P as a heating target. For example, the heating device 19 according to the embodiments of the present disclosure may be applied to a coater (e.g., a laminator) that laminates and thermally presses film as a coating member onto a surface of a sheet.

A description is provided of advantages of a temperature detector (e.g., the first thermistors 25, 25S, 25T, 25U, 25V and 25W).

As illustrated in FIG. 10, the temperature detector is positioned with respect to a counterpart (e.g., the heater holder 23) and detects a temperature of a detecting target (e.g., the heater 22). The temperature detector includes a temperature detecting element (e.g., the temperature detecting element 31), a holding body (e.g., the holding body 32), and a projecting engagement (e.g., the projecting engagement 32a). The temperature detecting element detects the temperature of the detecting target. The holding body is biased against the detecting target by a biasing member (e.g., the coil spring 40) and holds the temperature detecting element. The projecting engagement engages a hole (e.g., the hole 23b) disposed in the counterpart. The projecting engagement is mounted on the holding body.

According to the embodiments of the present disclosure, the projecting engagement is mounted on the holding body. Hence, the hole that engages the projecting engagement is not disposed in the holding body. That is, the hole is disposed in the counterpart. Accordingly, the temperature detector improves flexibility in a layout of parts disposed on the holding body.

According to the embodiments described above, the fixing belt 20 serves as an endless belt. Alternatively, a fixing film, a fixing sleeve, or the like may be used as an endless belt. Further, the pressure roller 21 serves as an opposed rotator. Alternatively, a pressure belt or the like may be used as an opposed rotator.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

What is claimed is:

1. A temperature detector positioned with respect to a counterpart, the temperature detector comprising:
   a temperature detecting element configured to detect a temperature of a detecting target; and
   a holding body configured to hold the temperature detecting element, the holding body including a projecting engagement integrally formed with the holding body and configured to engage the counterpart.

2. The temperature detector according to claim 1, wherein the projecting engagement projects from the holding body in a width direction perpendicular to a longitudinal direction of the temperature detector and positions the holding body with respect to the counterpart.

3. The temperature detector according to claim 1, further comprising a thermal insulator interposed between the temperature detecting element and the holding body,
   wherein the temperature detecting element is disposed opposite the detecting target.

4. The temperature detector according to claim 1, further comprising a conductor electrically connected to the temperature detecting element and extended from the holding body,
   wherein the projecting engagement is disposed on a lateral end of the holding body, the lateral end being from which the conductor is extended.

5. The temperature detector according to claim 1, further comprising a projection configured to position a biasing member,
   wherein the holding body includes a biased face mounting the projection, the biased face configured to be biased by the biasing member.

6. A heating device, comprising:
a heater including a heat generator;
a temperature detector configured to detect a temperature of one of the heater and a heated member heated by the heater;
a biasing member configured to bias the temperature detector against the one of the heater and the heated member; and
a counterpart to which the temperature detector is positioned,
the temperature detector including:
a temperature detecting element configured to detect the temperature of the one of the heater and the heated member; and
a holding body configured to hold the temperature detecting element and configured to be biased by the biasing member, the holding member including a projecting engagement integrally formed with the holding body and configured to engage the counterpart.

7. The heating device according to claim 6,
wherein the counterpart includes an accommodating portion into which the temperature detector is inserted,
wherein at least a part of the accommodating portion in an arbitrary cross section perpendicular to a longitudinal direction of the temperature detector has a dimension A in a width direction perpendicular to the longitudinal direction of the temperature detector,
wherein the temperature detector further includes an inserted portion inserted into the part of the accommodating portion, the inserted portion having a dimension B in the width direction of the temperature detector,
wherein an entirety of the temperature detector has a dimension C in a direction perpendicular to the width direction and the longitudinal direction of the temperature detector, and
wherein the dimensions A, B, and C satisfy a relation of B<A<C.

8. The heating device according to claim 7, further comprising a projection projecting from the holding body with a projecting dimension in a projecting direction,
wherein the holding body includes a biased face mounting the projection, the biased face configured to be biased by the biasing member, and
wherein the dimension C includes the projecting dimension.

9. The heating device according to claim 6,
wherein the counterpart includes a heater holder configured to hold the heater.

10. The heating device according to claim 9, further comprising a sandwiching member configured to sandwich and hold the heater and the heater holder,
wherein the projecting engagement is disposed closer to the sandwiching member than the temperature detecting element.

11. The heating device according to claim 9,
wherein the heater further includes a first positioner and the heater holder includes a second positioner configured to engage the first positioner, and
wherein the projecting engagement is disposed closer to the first positioner and the second positioner than the temperature detecting element.

12. The heating device according to claim 6, wherein the heat generator includes:
a first heat generating portion; and
a second heat generating portion arranged with the first heat generating portion with a gap between the first heat generating portion and the second heat generating portion.

13. The heating device according to claim 12, further comprising another temperature detector,
wherein the temperature detector and said another temperature detector are disposed opposite the first heat generating portion.

14. The heating device according to claim 12, wherein the counterpart includes a heater holder configured to hold the heater, the heater holder including a hole disposed opposite the gap between the first heat generating portion and the second heat generating portion.

15. The heating device according to claim 14,
wherein the hole is disposed outboard from a conveyance span where a heating target having a maximum width in a longitudinal direction of the heater is conveyed, the maximum width among a plurality of widths of a plurality of heating targets heated by the heater.

16. The heating device according to claim 12, further comprising a power interrupter configured to interrupt power supply to the heat generator when the heat generator has a predetermined temperature or higher,
wherein the power interrupter and the temperature detector are disposed opposite the first heat generating portion.

17. The heating device according to claim 6, wherein the temperature detector includes a thermistor.

18. The heating device according to claim 6, wherein the biasing member includes one of a coil spring and a flat spring.

19. A fixing device comprising the heating device according to claim 6.

20. An image forming apparatus, comprising:
an image forming device configured to form an image;
a heated member configured to fix the image on a recording medium; and
a heating device configured to heat the heated member, the heating device including:
a heater including a heat generator;
a temperature detector configured to detect a temperature of one of the heater and the heated member;
a biasing member configured to bias the temperature detector against the one of the heater and the heated member; and
a counterpart to which the temperature detector is positioned, and
the temperature detector including:
a temperature detecting element configured to detect the temperature of the one of the heater and the heated member; and
a holding body configured to hold the temperature detecting element and configured to be biased by the biasing member, the holding member including a projecting engagement integrally formed with the holding body and configured to engage the counterpart.

* * * * *